(12) United States Patent
Yamazaki et al.

(10) Patent No.: US 9,018,563 B2
(45) Date of Patent: Apr. 28, 2015

(54) CONSUMABLE-ELECTRODE GAS-SHIELD ARC WELDING METHOD AND CONSUMABLE-ELECTRODE GAS-SHIELD ARC WELDING SYSTEM

(75) Inventors: Kei Yamazaki, Fujisawa (JP); Reiichi Suzuki, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 128 days.

(21) Appl. No.: 13/076,915

(22) Filed: Mar. 31, 2011

(65) Prior Publication Data
US 2011/0259853 A1    Oct. 27, 2011

(30) Foreign Application Priority Data
Apr. 26, 2010 (JP) .................. 2010-101110

(51) Int. Cl.
| | |
|---|---|
| B23K 9/10 | (2006.01) |
| B23K 9/173 | (2006.01) |
| B23K 9/09 | (2006.01) |
| B23K 35/38 | (2006.01) |

(52) U.S. Cl.
CPC .............. B23K 9/173 (2013.01); B23K 9/092 (2013.01); B23K 9/1735 (2013.01); B23K 35/38 (2013.01); B23K 35/383 (2013.01)

(58) Field of Classification Search
USPC ................ 219/130.1, 130.5, 130.51
See application file for complete search history.

(56) References Cited

U.S. PATENT DOCUMENTS

| | | | | |
|---|---|---|---|---|
| 3,163,743 A | * | 12/1964 | Wroth et al. | 219/137 R |
| 3,328,556 A | * | 6/1967 | Nelson et al. | 219/137 R |
| 3,627,974 A | * | 12/1971 | Normando et al. | 219/130.51 |
| 4,159,410 A | * | 6/1979 | Cooper | 219/137.7 |
| 4,441,012 A | * | 4/1984 | Risbeck et al. | 219/137 R |
| 4,780,594 A | * | 10/1988 | Rothermel | 219/137.71 |

(Continued)

FOREIGN PATENT DOCUMENTS

| | | |
|---|---|---|
| CN | 101543927 A | 9/2009 |
| GB | 1 370 217 | 10/1974 |

(Continued)

OTHER PUBLICATIONS

Extended European Search Report issued Oct. 7, 2011, in Patent Application No. 11003123.4.

(Continued)

*Primary Examiner* — Henry Yuen
*Assistant Examiner* — Ayub Maye
(74) *Attorney, Agent, or Firm* — Oblon, McClelland, Maier & Neustadt, L.L.P.

(57) ABSTRACT

In consumable-electrode gas-shield arc welding, carbon dioxide gas is used as shield gas; the molten pool is formed using a pulsed arc as a leading electrode arc transferring one droplet per cycle by alternately outputting, in each cycle, pulses of two different pulse waveforms of which a pulse peak current level and/or a pulse width per period differ; the conductively heated filler wire is inserted into the molten pool as a trailing electrode; the distance between a tip of the filler wire inserted into the molten pool and a conductive point of the filler wire is set within a range of $200 \times 10^{-3}$ to $500 \times 10^{-3}$ m; and a leading-electrode base current value is set larger than a trailing-electrode filler current value. According to such a method, even when inexpensive carbon dioxide gas is used as shield gas, the amount of spatter can be reduced, and high weldability can be achieved in multipass welding.

5 Claims, 8 Drawing Sheets

(56) References Cited

U.S. PATENT DOCUMENTS

| | | | |
|---|---|---|---|
| 5,124,527 A | 6/1992 | Takano et al. | |
| 5,686,002 A * | 11/1997 | Flood et al. | 219/137 R |
| 2003/0062355 A1* | 4/2003 | Ikegami et al. | 219/137 PS |
| 2006/0138115 A1* | 6/2006 | Norrish et al. | 219/137.71 |
| 2006/0243704 A1* | 11/2006 | Matz et al. | 219/74 |
| 2007/0102409 A1 | 5/2007 | Koshiishi et al. | |
| 2007/0210048 A1 | 9/2007 | Koshiishi et al. | |
| 2008/0142490 A1 | 6/2008 | Suzuki et al. | |
| 2009/0242533 A1 | 10/2009 | Yamazaki et al. | |
| 2009/0261085 A1 | 10/2009 | Suzuki et al. | |
| 2010/0059493 A1* | 3/2010 | McAninch | 219/137 PS |

FOREIGN PATENT DOCUMENTS

| | | |
|---|---|---|
| JP | 2-30378 | 1/1990 |
| JP | 3-275280 | 12/1991 |
| JP | 2003-320454 | 11/2003 |
| JP | 2008-55506 | 3/2008 |

OTHER PUBLICATIONS

U.S. Appl. No. 13/085,966, filed Apr. 13, 2011, Yamazaki et al.
U.S. Appl. No. 13/471,872, filed May 15, 2012, Suzuki et al.
Office Action issued Jun. 5, 2013 in Chinese Application No. 201110096633.3 (With English Translation).

* cited by examiner

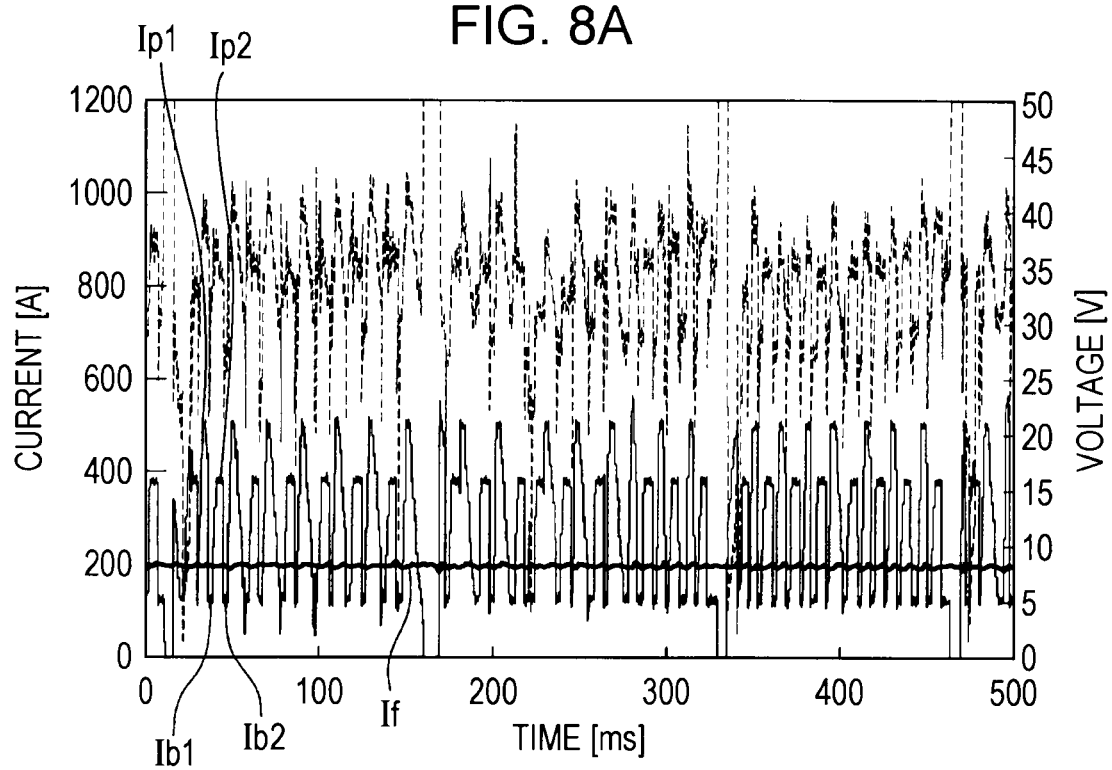
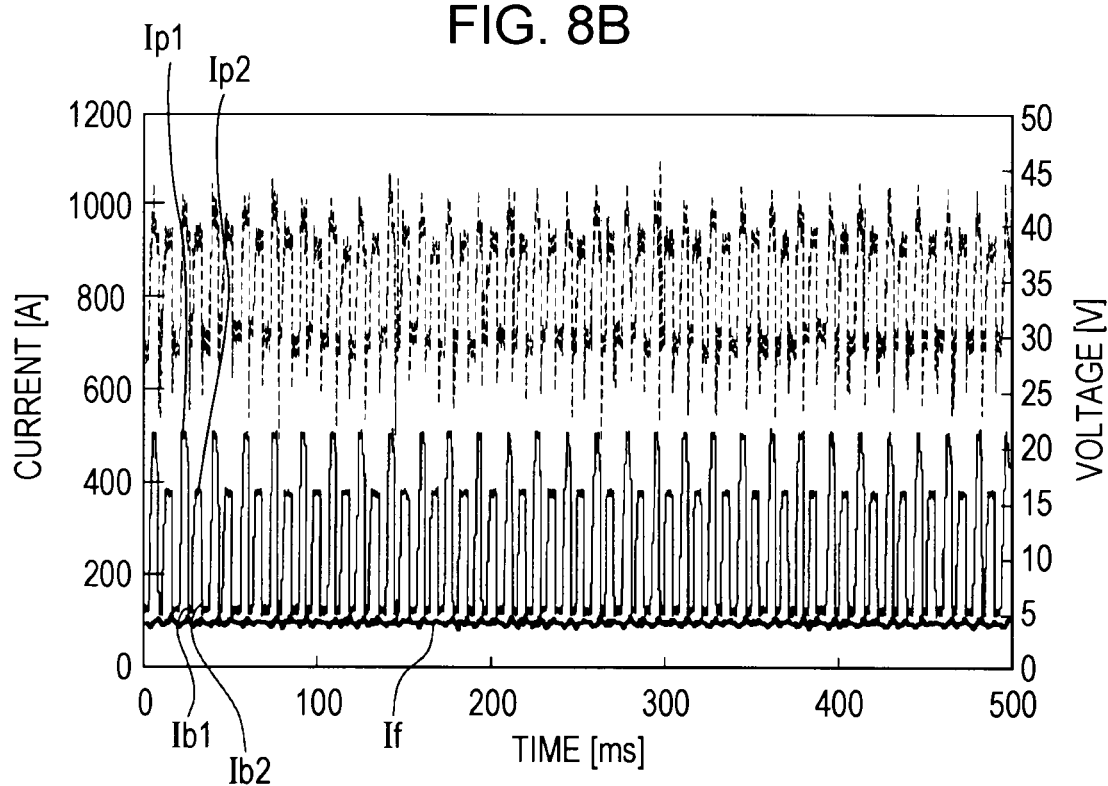

CONSUMABLE-ELECTRODE GAS-SHIELD ARC WELDING METHOD AND CONSUMABLE-ELECTRODE GAS-SHIELD ARC WELDING SYSTEM

BACKGROUND OF THE INVENTION

1. Field of the Invention

The present invention relates to a consumable-electrode gas-shield arc welding method and a consumable-electrode gas-shield arc welding system that uses a consumable electrode wire and a conductively-heated filler wire.

2. Description of the Related Art

Recently, in the manufacturing industry, efforts have been made to reduce work periods and costs, and there has been an increasing need for improving the efficiency of consumable-electrode gas-shield arc welding. In a consumable-electrode gas-shield arc welding method using one electrode wire, an increase in the wire melting speed to improve efficiency frequently causes various problems, such as the generation of a large amount of spatter, unstableness in the arc due to a variation in the wire feeding rate, formation of an irregular bead due to the deepening of the welding pool, and the occurrence of welding failures. Therefore, there is a limit in increasing the wire melting rate to improve weldability and efficiency.

A hot-wire gas metal arc (GMA) welding method, which is a consumable-electrode gas-shield arc welding method using two consumable electrode wires (hereinafter, referred to as "two electrode wires") improves efficiency of arc welding by forming a welding pool by generating an arc with a consumable electrode wire and inserting a conductively-heated filler wire into the welding pool.

As techniques employing such a hot-wire GMA welding method, for example, the following techniques are proposed. Japanese Unexamined Patent Application Publication No. 3-275280 proposes a welding method of generating an arc with a leading consumable electrode wire by inserting two wires into a shield gas nozzle, inserting a trailing filler wire into a molten pool, and branching part of the welding current flowing from the consumable electrode wire to the base metal to the filler wire so as to merge this branching current to a ground terminal of the welding power supply. By using such a welding method, currents flow in opposite directions through the closely disposed consumable electrode wire and filler wire, and thus the arc is constantly directed forward, enabling a sufficient melting depth during high-speed welding.

Japanese Unexamined Patent Application Publication No. 2008-055506 proposes a two-welding-wire-feed arc welding method that speeds up the cooling of a molten pool and the filling of molten metal by generating an arc at a leading consumable electrode wire and inserting a non-energized trailing filler wire into the molten pool. By using such a welding method, the formation of irregular beads due to, for example, undercut and humping can be prevented in high-speed welding of a lap joint.

SUMMARY OF THE INVENTION

Such welding methods using a filler wire are well-known. However, with hot-wire GMA welding, the problem of a large amount of spatter being generated due to magnetic interference between the two electrodes is not solved, and thus, the welding method has not been technically established. Specifically, when carbon-dioxide-gas arc welding, whose gas cost is low, is used at the leading electrode, spatter significantly increases, and thus, this method has not been put to practical use.

For example, with the welding method proposed in Japanese Unexamined Patent Application Publication No. 3-275280, the leading electrode arc become unstable by receiving magnetic interference due to a shunt current of a trailing electrode disposed near a leading electrode. As a result, there is a problem in that the amount of spatter generated from the leading electrode increases compared with when one electrode wire is used. To increase the melting speed of the filler wire in order to increase weldability, the shunt current has to be increased to approximately 200 A to 400 A. Therefore, there is a problem in that the amount of spatter generated from the leading electrode arc significantly increases.

With the welding method proposed in Japanese Unexamined Patent Application Publication No. 3-275280, when inexpensive carbon dioxide gas is used as shield gas of a leading electrode arc and welding is performed using a regular DC constant-voltage power supply, the amount spatter generated due to magnetic interference significantly increases because droplet transfer from the leading electrode is irregular globular transfer. In such a case, the spatter attached to the gas nozzle causes shield irregularity, and many large-size spatters attach to the welding part and the surroundings. There is also such a problem when the current applied to the trailing electrode filler is taken from a separate power supply, instead of the shunt current.

In the welding method according to Japanese Unexamined Patent Application Publication No. 2008-055506, since the filler wire is not conductively heated, there is a problem in that the melting speed of the filler wire cannot be increased significantly. Therefore, an increase in the welding capacity desired in multipass welding of moderately thick plates cannot be expected.

The present invention has been conceived in light of the problems described above and provides a consumable-electrode gas-shield arc welding method and a consumable-electrode gas-shield arc welding system that generate a small amount of spatter and achieve a large welding capacity in multipass welding of moderately thick plates even when inexpensive carbon dioxide gas is used as shield gas in consumable-electrode gas-shield arc welding using a consumable electrode wire and a conductively-heated filler wire.

To solve the problems described above the consumable-electrode gas-shield arc welding method according to the present invention is a consumable-electrode gas-shield arc welding method of adding a filler wire conductively heated by a filler current to a molten pool formed by an arc generated at a consumable electrode wire, the method includes the steps of using carbon dioxide gas as shield gas; forming the molten pool using a pulsed arc as a leading electrode arc transferring one droplet per cycle by alternately outputting pulses, one at a time, of two different pulse waveforms of which at least one of a pulse peak current level and a pulse width per period differ; inserting into the molten pool the conductively heated filler wire as a trailing electrode; setting the distance between a tip of the filler wire inserted into the molten pool and a conductive point of the filler wire within a range of $200 \times 10^{-3}$ to $500 \times 10^{-3}$ m; and setting a leading-electrode base current value larger than a trailing-electrode filler current value.

Through such steps, the consumable-electrode gas-shield arc welding method achieves low cost and highly efficient arc welding by performing arc welding using carbon dioxide gas as shield gas and using two electrode wires, i.e., a consumable electrode wire and a conductively-heated filler wire. By using a pulsed arc as the leading electrode arc, formation and detachment of droplets can be performed regularly in synchronization with the pulse current waveforms.

By increasing the conductive heating distance of the filler wire while the distance between the tip of the filler wire inserted into the molten pool and the conductive point of the filler wire are set within a predetermined range, the filler current required for preheating the filler wire can be significantly reduced compared with that in the related art. Furthermore, by setting the trailing-electrode filler current value smaller than or equal to the leading-electrode base current value, magnetic interference to the leading electrode arc during the base periods due to the filler current applied to the trailing electrode can be suppressed, and the rigidity of the leading electrode arc can be maintained.

In the consumable-electrode gas-shield arc welding method according to the present invention, it is desirable that the electrode distance De [m] between the tip of the consumable electrode wire and the tip of the filler wire be set within the range of $4 \times 10^{-3}$ to $15 \times 10^{-3}$ m, and the relationship among the electrode distance De [m], the conductive heating distance Ex [m] between the tip of the filler wire inserted into the molten pool and the conductive point of the filler wire, the feeding rate Vw [m/s] of the filler wire, and the current density J [A/m²] of the filler wire satisfies the following expression:

$$4 \le \left( \frac{Ex^2}{De \cdot Vw^2} j^2 \times 10^{-18} \right) \le 10 \quad (1)$$

Through such steps, the consumable-electrode gas-shield arc welding method can optimize the temperature distribution of the filler wire being fed by establishing a predetermined relationship among the electrode distance De [m], the conductive heating distance Ex [m], the feeding rate Vw [m/s] of the filler wire, and the current density J [A/m²] of the filler wire. Therefore, underheating and overheating of the filler wire can be prevented, and the generation of spatter from the leading electrode arc caused by disturbing the molten pool by unmelted filler wire contacting a welding member to be welded and the generation of spatter a result of an arc generated from the filler side due to a slight change in feeding when the filler wire is overheated and softened can be prevented.

In the consumable-electrode gas-shield arc welding method according to the present invention, it is desirable to set the trailing-electrode filler current value to 150 A or smaller.

Through such a step, the consumable-electrode gas-shield arc welding method can suppress magnetic interference to the leading electrode arc during the base periods due to a filler current applied to the trailing electrode by setting the trailing-electrode filler current value to a predetermined value or smaller.

The consumable-electrode gas-shield arc welding system according to the present invention in a consumable-electrode gas-shield arc welding system using carbon dioxide gas as shield gas includes a leading electrode torch supplying a consumable electrode wire being a leading electrode to a member to be welded, the leading electrode torch forming a molten pool using a pulsed arc as a leading electrode arc transferring one droplet per cycle by alternately outputting, in each cycle, pulses, one at a time, of two different pulse waveforms of which at least one of the pulse peak current level and the pulse width; and a trailing electrode torch supplying a filler wire being a trailing electrode to the molten pool, the trailing electrode torch including a feeding member arranged such that the distance between a tip of the filler wire inserted into the molten pool and a conductive point of the filler wire is within a range of $200 \times 10^{-3}$ to $500 \times 10^{-3}$ m, the feeding member conductively heating the filler wire with a filler current. The leading-electrode base current value is set larger than the trailing-electrode filler current value.

The consumable-electrode gas-shield arc welding system having such a configuration enables low cost and high efficiency arc welding by performing arc welding using carbon dioxide gas as shield gas and using two electrode wires, i.e., a consumable electrode wire and a conductively-heated filler wire. By using a pulsed arc as a leading electrode arc, formation and detachment of droplets can be carried out regularly in synchronization with the pulse current waveform.

By increasing the conductive heating distance of the filler wire while the distance between the tip of the filler wire inserted into the molten pool and the conductive point of the filler wire are set within a predetermined range, the filler current required for preheating the filler wire can be significantly reduced compared with that in the related art. Furthermore, by setting the trailing-electrode filler current value smaller than or equal to the leading-electrode base current value, magnetic interference to the leading electrode arc during the base period due to the filler current applied to the trailing electrode can be suppressed, and the rigidity of the leading electrode arc can be maintained.

With the consumable-electrode gas-shield arc welding method and the consumable-electrode gas-shield arc welding system according to the present invention, even when inexpensive carbon dioxide gas is used as shield gas, formation and detachment of droplets can be performed in the same manner as when one electrode wire is used, and the amount of spatter generated can be significantly reduced compared with a hot-wire GMA welding method in which a regular DC constant-voltage power supply is used for the leading electrode arc. Since arc welding using two electrode wires, i.e., the consumable electrode wire and the conductively heated filler wire, is performed, the welding capacity can be increased during multipass welding of moderately thick plates. Accordingly, a welding method and a welding system of low cost, less spatter, and a large welding capacity can be provided.

BRIEF DESCRIPTION OF THE DRAWINGS

FIG. 7A is a graph representing the relationship between the filler wire feeding rate and a filler current value for various conductive heating distances, and FIG. 7B is a graph representing the relationship between the filler wire feeding rate and the amount of spatter generated for various conductive heating distances; and FIGS. 8A and 8B illustrate experimental examples verifying the advantages of the present invention, where FIG. 8A is a graph illustrating the temporal changes in the welding current and welding voltage of a leading electrode and the filler current value of the trailing electrode when pulsed arc welding is performed while the pulse base current value is set lower than the filler current value, and FIG. 8B is a graph illustrating the temporal changes in the welding current and welding voltage of the leading electrode and the filler current value of the trailing electrode when pulsed arc welding is performed while the pulse base current value is set larger than the filler current value.

DESCRIPTION OF THE PREFERRED EMBODIMENTS

A consumable-electrode gas-shield arc welding system and a consumable-electrode gas-shield arc welding method according to embodiments of the present invention will be described in detail below with reference to the drawings. First, the outline of pulsed arc welding will be described, and then, an arc welding system and an arc welding method will be described. In the description below, "consumable-electrode gas-shield arc welding system" may also be referred to as "arc welding system", and "consumable-electrode gas-shield arc welding method" may also be referred to as "arc welding method."

Outline of Pulsed Arc Welding

Figure 1:
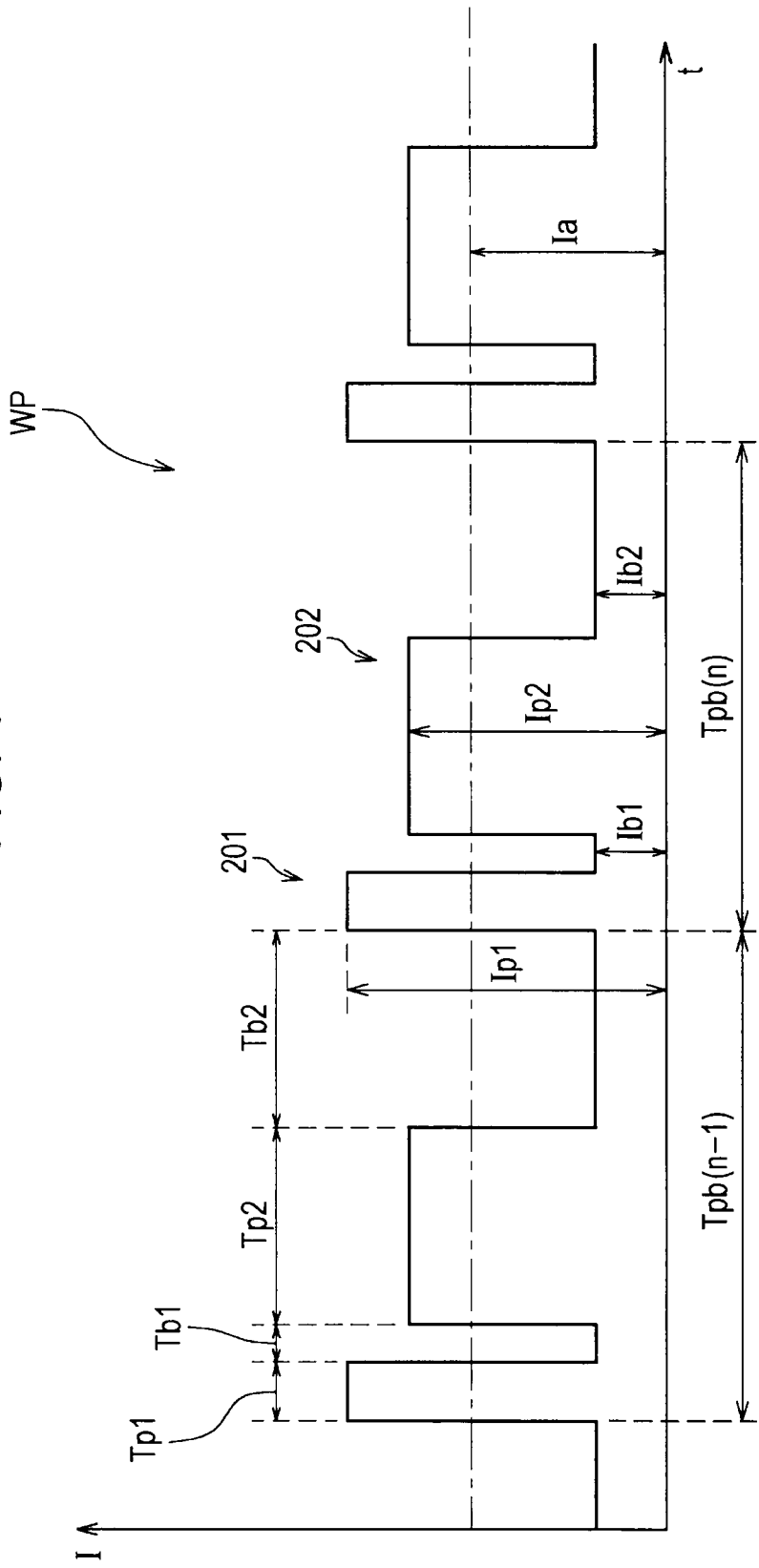
FIG. 1 is a waveform diagram illustrating example pulse waveforms generated by a welding control device of a consumable-electrode gas-shield arc welding system according to an embodiment.

The arc welding system and the arc welding method are not based on arc welding using a regular DC constant-voltage power supply but are based on pulsed arc welding in which one droplet is transferred in each pulse cycle as a result of a welding control device of the arc welding system outputting, to a welding power source, two different pulsed waveforms, as illustrated in FIG. 1, alternately generated one at a time in each pulse cycle on the basis of preset waveform parameters. The outline of pulsed arc welding will be described briefly below with reference to FIG. 1.

As illustrated in FIG. 1, a pulsed waveform WP is a current waveform repeating a pattern of rectangles or trapezoids generated by a welding control device, which is described below. The pulsed wave WP includes a first pulse 201, which is illustrated in FIG. 1, having a first pulse waveform for detaching a droplet from the tip of a consumable electrode wire. A first pulse period includes a peak period Tp1 and a base period Tb1 of the first pulse 201. As illustrated in FIG. 1, the first pulse 201 has a peak current value Ip1 and a base current value Ib1. The peak current value Ip1 is set larger than the peak current value Ip2 of the second pulse 202.

The second pulse 202 included in the pulsed waveform WP, which is illustrated in FIG. 1, has a second pulse waveform for forming a droplet. A second pulse period includes a peak period Tp2 and a base period Tb2 of the second pulse 202. As illustrated in FIG. 1, the second pulse 202 has a peak current value Ip2 and a base current value Ib2. In the pulsed waveform WP illustrated in FIG. 1, an average current value Ia is the temporal average of a time integration of the welding current.

One pulse cycle contains the first pulse period and the second period. In FIG. 1, the (n−1)th pulse cycle Tpb(n−1) is the previous pulse cycle, and the nth pulse cycle Tpb(n) is the current pulse cycle. In FIG. 1, the first pulse 201 and the second pulse 202 are represented as rectangles. However, each of these actually includes a first-pulse rising slope period and a second-pulse rising slope period, which are rising slope periods from the base current to the peak current, and a pulse falling slope period from the peak current to the base current.

Figure 2:
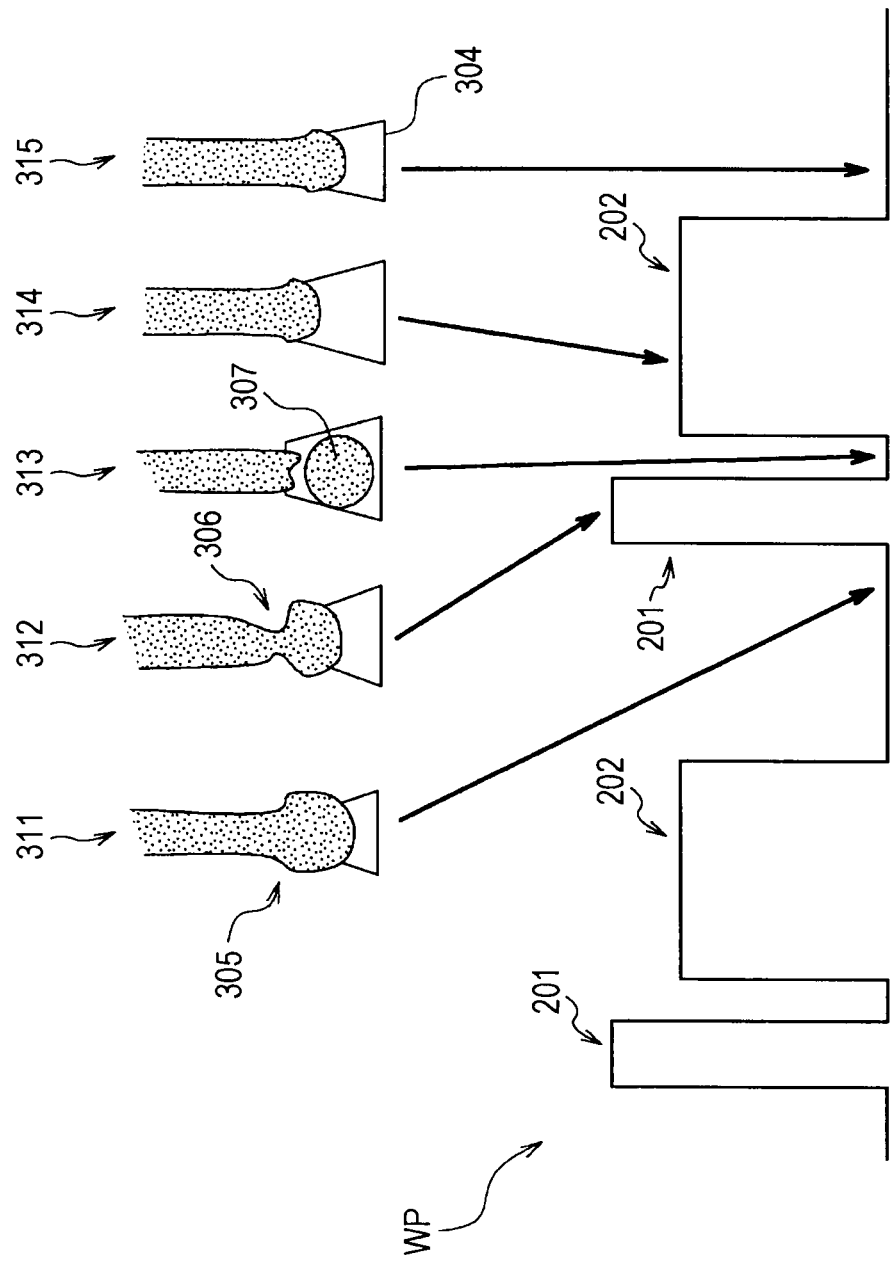
FIG. 2 is a schematic diagram of the temporal change at the welding wire tip caused by pulse waveforms generated by the welding control device of the consumable-electrode gas-shield arc welding system according to an embodiment.

The welding control device of the arc welding system according to this embodiment detects the welding voltage and the welding current during welding, as described below. When a constriction 306 in a droplet, as illustrated in FIG. 2, is detected on the basis of at least of one of the welding voltage and the welding current, the current value of the first pulse 201 is immediately switched to a predetermined value lower than the current value at the time of detection. FIG. 2 illustrates an example in which the predetermined current value is the base current. Details of droplet transfer associated with such switching of current values will be described below.

In FIG. 2, the tip 305 of a consumable electrode wire 311 develops during the second-pulse peak period Tp2 after a droplet detaches in the previous pulse cycle Tpb(n−1). Since the current suddenly drops in the second-pulse base period Tb2, the force pushing the droplet upward weakens, and the droplet forms at the consumable electrode wire tip 305 in a suspending manner.

Then, during the first-pulse peak period Tp1, the droplet deforms into a shape represented by reference numeral 312 in FIG. 2 due to the electromagnetic pinch force generated by the peak current, and a constriction 306 rapidly forms. By detecting the constriction 306 before the droplet is detached, even during the first-pulse peak period Tp1 or the first-pulse rising slope period, the current is immediately switched to the first-pulse base current value Ib1 or a predetermined current lower than the current at the time of detection so that at the moment the arc moves toward the wire after detachment of the droplet, a low current state is entered as represented by reference numeral 313 in FIG. 2. In this way, small spatters due to scattering from the constriction 306 of the wire and/or scattering of the residual melt after detachment of the droplet can be significantly reduced.

As represented by reference numeral 314 in FIG. 2, in the second-pulse peak period Tp2, the droplet is developed after setting the second-pulse peak current value Ip2 to a value that does not cause the melt remaining on the wire after the droplet is detached to detach or scatter. Then, as represented by reference numeral 315 in FIG. 2, another droplet is developed in the second-pulse base period Tb2 until it reaches the state represented by reference numeral 311 again. Accordingly, transfer of a droplet per cycle can be performed extremely regularly.

At this time, as described below, by setting the current value in the first-pulse base period Tb1 and the second-pulse base period Tb2 larger than or equal to the filler conductive current value, magnetic interference to the leading electrode arc can be prevented during the base period, and thus, rigidity of the leading electrode arc can be maintained. As a result, even when inexpensive carbon dioxide gas is used as shield gas, the formation and detachment of droplets occur in the same manner as when one electrode wire is used, and the amount of spatter generated can be significantly reduced compared with a hot-wire GMA welding method in which a regular DC constant-voltage power supply is used for the leading electrode arc.

Figure 3:
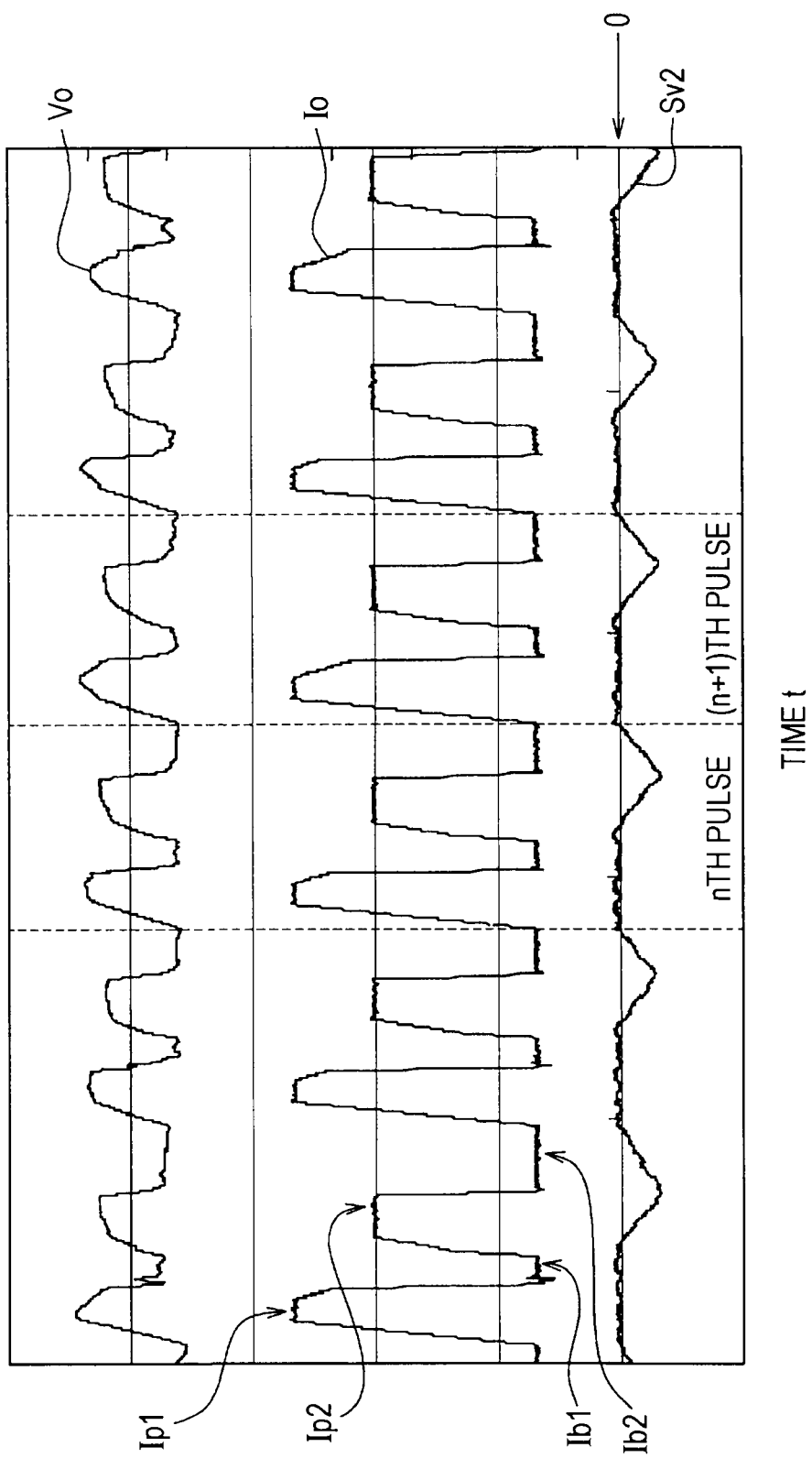
FIG. 3 is a timing chart of the welding voltage and welding current measured by the welding control device of the consumable-electrode gas-shield arc welding system according to an embodiment.

An example of welding voltage instantaneous values Vo detected by the welding control device of the arc welding system according to this embodiment is illustrated at the top in FIG. 3, and an example of welding current instantaneous values Io is illustrated in the middle of FIG. 3. As described below, the welding control device calculates a voltage error integral value Sv2 represented by the following Expression 2. An example of the calculation results of the voltage error integral value Sv2 is illustrated at the bottom of FIG. 3.

$$Sv2=\int\{Ks(Io2-Is2)+Vs2-Vo2\}dt \quad (2)$$

In Expression 2, Ks represents the external characteristic gradient of the welding power supply and is determined in accordance with a predetermined feeding rate of the consumable electrode wire, the welding voltage, and the wire type. Is2 represents a welding current set value in the second pulse period and is determined in accordance with a predetermined welding current set value Is. Vs2 represents a welding voltage set value in the second pulse period and is determined in accordance with a predetermined welding voltage set value Vs. Io2 represents a welding current instantaneous value detected in the second pulse period. Vo2 represents a welding voltage instantaneous value detected in the second pulse period.

The welding control device starts calculating the voltage error integral value Sv2, which is represented by Expression 2, at the moment the first pulse period ends and the second pulse period starts in a pulse cycle. For example, in FIG. 3, in the first pulse period in the nth pulse cycle, the voltage error integral value Sv2 is zero, but after the moment the second pulse period starts, the voltage error integral value Sv2 drops below zero. After the second-pulse peak period Tp2 ends, Sv2 begins to rise to zero, and when Sv2 reaches zero, the nth pulse cycle ends to start the (n+1)th pulse cycle.

Consumable-Electrode Gas-Shield Arc Welding System

An arc welding system 1 according to this embodiment will be described below in detail with reference to FIG. 4. As described above, the arc welding system 1 performs welding by using carbon dioxide gas as shield gas G, forming a molten pool M with an arc at a consumable electrode wire 6a, which is a leading electrode, and adding a filler wire 6b, which is trailing electrode, to the molten pool M.

Figure 4:
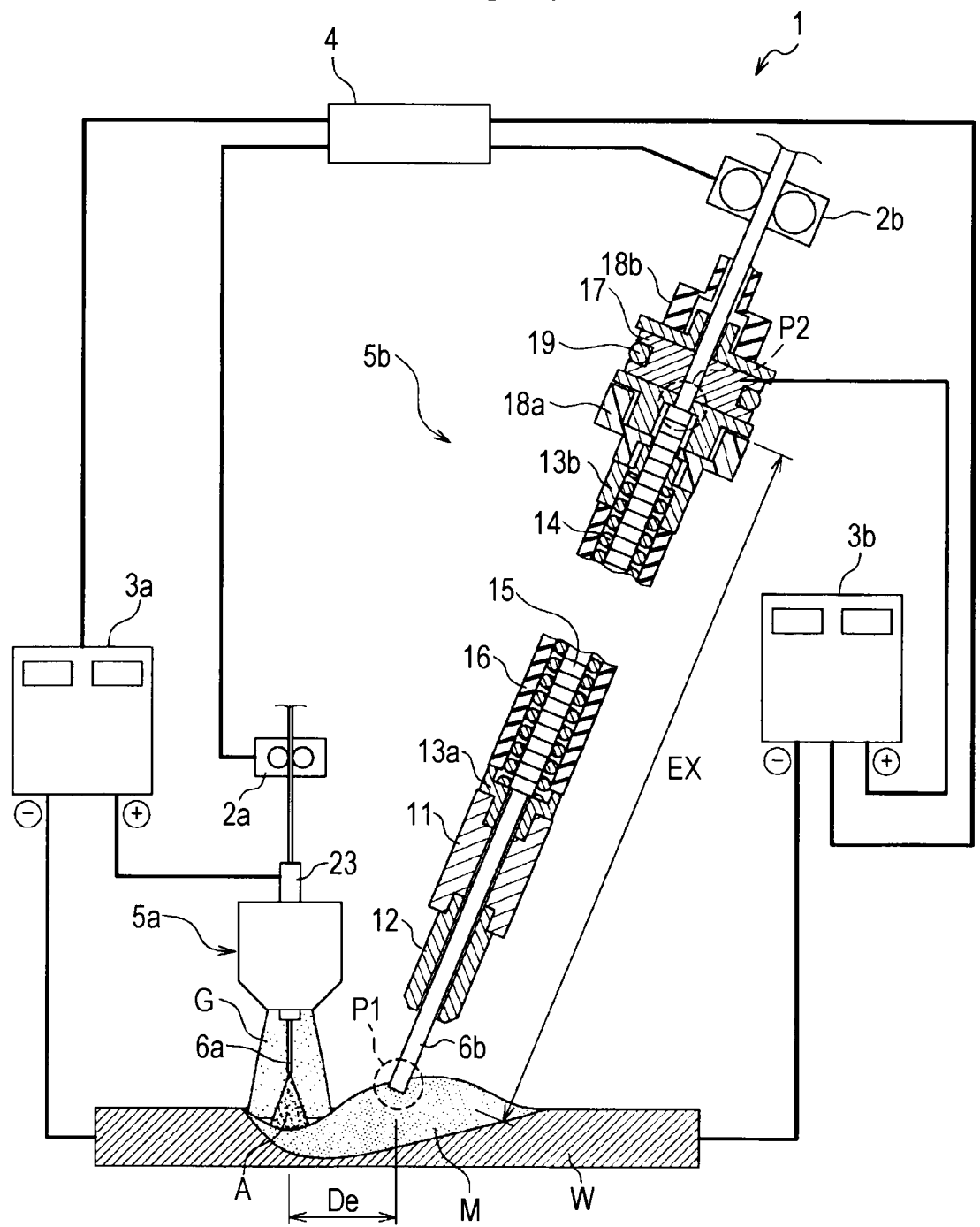
FIG. 4 is a schematic view of a consumable-electrode gas-shield arc welding system according to an embodiment.

As illustrated in FIG. 4, the arc welding system 1 includes wire feeding devices 2a and 2b, a welding power supply 3a, a filler power supply 3b, a welding control device 4, a leading electrode torch 5a, which supplies the consumable electrode wire 6a from its tip, and a trailing electrode torch 5b, which supplies the filler wire 6b from its tip. The components in the arc welding system 1 will be described in detail below.

The wire feeding device 2a feeds the consumable electrode wire 6a to the leading electrode torch 5a and includes rollers for sending out the consumable electrode wire 6a. As illustrated in FIG. 4, the wire feeding device 2a is connected to the welding power supply 3a via the welding control device 4. When the welding control device 4 outputs a welding command signal to the welding power supply 3a, the wire feeding device 2a is driven by the welding power supply 3a to feed the consumable electrode wire 6a to the leading electrode torch 5a from a wire storage container (not shown) through a wire feeding path (not shown).

The wire feeding device 2b feeds the filler wire 6b to the trailing electrode torch 5b and includes rollers for sending out the filler wire 6b. As illustrated in FIG. 4, the wire feeding device 2b is connected to the filler power supply 3b via the welding control device 4. When the welding control device 4 outputs a command signal to the filler power supply 3b, the wire feeding device 2b is driven by the filler power supply 3b to feed the filler wire 6b to the trailing electrode torch 5b from a wire storage container (not shown) through a wire feeding path (not shown).

The welding power supply 3a drives the wire feeding device 2a, which sends out the consumable electrode wire 6a, by outputting a rotation control signal to the wire feeding device 2a and supplies a welding current to the consumable electrode wire 6a. In response to the control of the welding control device 4, the welding power supply 3a supplies, to the consumable electrode wire 6a via a feed chip 23 described below, a welding current and a welding voltage large enough to generate an arc between a welding member W to be welded and the consumable electrode wire 6a. Details of the welding power supply 3a will be described below.

The filler power supply 3b drives the wire feeding device 2b, which sends out the filler wire 6b, by outputting a rotation control signal to the wire feeding device 2b and supplies a filler current to the filler wire 6b. The filler power supply 3b supplies a filler current and a filler voltage to the filler wire 6b via a feed block 17 so as to heat the filler wire 6b by Joule heat in response to the control of the welding control device 4. Details of the internal configuration of the filler power supply 3b will be described below.

When a regular constant-voltage welding power supply is used as the filler power supply 3b, the amount of wire feeding and the filler current cannot be controlled independently. Moreover, with a regular constant-voltage welding power supply, conditions for forming a stable molten pool M without generating an arc becomes very limited, and the advantage of the method according to this embodiment cannot be achieved. Thus, to acquire a satisfactory welding bead without generating an arc as much as possible at the filler wire 6b, it is desirable to use a constant-current welding power supply as the filler power supply 3b so that the amount of wire feeding and the filler current can be controlled independently.

It is even more desirable that the filler power supply 3b be capable of instantaneously lowering the filler current value If to 10 A or smaller, regardless of the set current value, to suppress the melting of the filler wire 6b and prevent the generation of an arc when a voltage greater than a predetermined voltage is detected across the filler wire 6b and the welding member W, i.e., when the generation of an arc is detected.

The welding control device 4 controls the welding current supply from the welding power supply 3a, the filler current supply from the filler power supply 3b, and the driving of the wire feeding devices 2a and 2b. Details of the internal configuration of the welding control device 4 will be described below.

The leading electrode torch 5a supplies the consumable electrode wire 6a to the welding member W in response to the driving by the wire feeding device 2a. The feed chip 23, which is described below, is disposed inside the leading electrode torch 5a, and the welding current from the welding power supply 3a is supplied to the consumable electrode wire 6a via the feed chip 23.

As described above, the welding current is a pulsed current having first pulses 201 and second pulses 202, which have different pulse peak current levels and/or pulse widths per pulse cycle. Thus, as described above, a pulsed arc that transfers one droplet per cycle is generated between the consumable electrode wire 6a and the welding member W, and a molten pool M, such as that illustrated in FIG. 4, is formed. The polarity of the consumable electrode wire 6a supplied from the leading electrode torch 5a at this time is DCEP, as illustrated in FIG. 4.

The wire feeding device 2b drives the trailing electrode torch 5b to supply the filler wire 6b to the molten pool M. The feed block 17, which is described below, is disposed inside the trailing electrode torch 5b, and the filler current from the filler power supply 3b is supplied to the filler wire 6b via the feed block 17. Details of the internal configuration of the trailing electrode torch 5b will be described below.

When a filler current is supplied from the filler power supply 3b to the feed block 17 of the filler wire 6b, the filler wire 6b running through the feed block 17 is conductively heated by Joule heat. Then, the conductively-heated filler wire 6b, which thus can be easily melted, is inserted into the molten pool M formed by the filler wire 6b to form molten metal, as illustrated in FIG. 4. At this time, the polarity of the filler wire 6b supplied from the trailing electrode torch 5b may be either DCEP or DCEN.

The consumable electrode wire 6a is supplied from the leading electrode torch 5a to the welding member W, and the filler wire 6b is supplied from the trailing electrode torch 5b to the molten pool M. For example, solid wire or flux-contained wire may be used as the consumable electrode wire 6a and the filler wire 6b. The wires 6a and 6b may be either the same type of wire or different types of wire. The wire diameters of the consumable electrode wire 6a and the filler wire 6b should be changed appropriately in accordance with welding conditions and may be set within the range of, for example, 1.0 to 1.6 mmϕ.

In the arc welding system 1 according to this embodiment of the present invention, the leading-electrode base current value of the welding power supply 3a is set larger than the trailing-electrode filler current value of the filler power supply 3b in advance. By setting the leading-electrode base current value larger than the trailing-electrode filler current value, magnetic interference due to the influence of the filler current during the base period of the leading electrode arc can be suppressed. Thus, the rigidity of the leading electrode arc can be maintained. The leading-electrode base current value and the trailing-electrode filler current value are, for example, directly set by an operator before performing arc welding.

The configuration of the trailing electrode torch 5b of the arc welding system 1 will be described below in detail with reference to FIG. 4. As illustrated in FIG. 4, the trailing electrode torch 5b includes a torch body 11, a wire guide 12, connecting members 13a and 13b, a spring liner 14, ceramic rings 15, an insulating cover 16, the feed block 17, insulated joints 18a and 18b, and a holddown spring 19. The configuration of the trailing electrode torch 5b will be described in detail below. In FIG. 4, the size and dimension of the trailing electrode torch 5b are enlarged for the sake of description.

The torch body 11 is a cylindrical member and is the main body of the trailing electrode torch 5b. As illustrated in FIG. 4, the torch body 11 has a hole with a diameter large enough to pass the filler wire 6b therethrough. The end of the torch body 11 closer to the torch tip is connected to the wire guide 12, and the other end closer to the torch rear is connected to the spring liner 14, the ceramic rings 15, and the insulating cover 16 via the connecting member 13a.

The wire guide 12 is a cylindrical member that guides and sends out the filler wire 6b from the tip of the trailing electrode torch 5b. As illustrated in FIG. 4, the wire guide 12 has a hole with a diameter large enough to pass the filler wire 6b therethrough. The end of the wire guide 12 closer to the torch rear is connected to the torch body 11.

The spring liner 14 is a cylindrical member that passes the filler wire 6b therethrough. The spring liner 14 is, for example, made of a resilient member, such as a coil spring. As illustrated in FIG. 4, a wire feeding path constituted of the insulating ceramic rings 15 is disposed inside the spring liner 14. The external part of the spring liner 14 is covered with the insulating cover 16. Accordingly, the internal and external parts of the spring liner 14 are insulated with insulating material. The end of the spring liner 14 closer to the torch tip is connected to the torch body 11 via the connecting member 13a, and the other end closer to the torch rear is connected to the insulated joint 18a via the connecting member 13b.

The ceramic rings 15 are cylindrical members that insulate the running filler wire 6b. As illustrated in FIG. 4, the ceramic rings 15 have holes with a diameter large enough to pass the filler wire 6b therethrough and constitute a cylindrical wire feeding path by being aligned in the feeding direction of the filler wire 6b. The end of the ceramic ring 15 closest to the torch tip is connected to the torch body 11 via the connecting member 13a, and the end of the ceramic ring 15 closest to the torch rear is connected to the feed block 17. The ceramic rings 15 insulate the trailing electrode torch 5b.

The insulating cover 16 is a cylindrical member that insulates the inside of the trailing electrode torch 5b. The insulating cover 16 is made of, for example, an insulating resin, such as rubber. As illustrated in FIG. 4, the insulating cover 16 covers the spring liner 14. The end of the insulating cover 16 closer to the torch tip is connected to the torch body 11 via the connecting member 13a, and the end closer to the torch rear is connected to the insulated joint 18a via the connecting member 13b. The insulating cover 16 insulates the trailing electrode torch 5b.

The feed block 17 is a feeding member that feeds the filler current to the running filler wire 6b. The feed block 17 is a conductive member and, as illustrated in FIG. 4, has a hole with a diameter that allows the filler wire 6b to run through and be in contact with the feed block 17. The end of the feed block 17 closer to the torch tip is connected to the ceramic rings 15 and the insulated joint 18a, and the other end closer to the torch rear is connected to the insulated joint 18b. Thus, the feed block 17 is insulated from the feed chip 23 of the consumable electrode wire 6a.

With the hot-wire GMA welding method in the related art, since the filler current feed point is disposed near the tip of the trailing electrode torch, the conductive heating distance Ex [m] is approximately $25 \times 10^{-3}$ to $100 \times 10^{-3}$ m, and a large current has to be applied to the filler wire 6b to acquire a large welding capacity. Therefore, with the hot-wire GMA welding method in the related art, the leading electrode arc receives magnetic interference due to the filler current supplied to the filler wire 6b, which is the trailing electrode, making regular formation and detachment of droplets impossible and causing arc interruption.

With the arc welding system 1 according to this embodiment of the present invention, the length of the trailing electrode torch 5b is adjusted such that the conductive heating distance Ex [m] of the filler wire 6b is within the range of $200 \times 10^{-3}$ to $500 \times 10^{-3}$ m. As illustrated in FIG. 4, the conductive heating distance Ex [m] is the distance between the tip P1 of the filler wire 6b inserted into the molten pool M and the conductive point P2 of the filler wire 6b. As illustrated in FIG. 4, the tip P1 of the filler wire 6b is the part of the filler wire 6b inserted into the surface of the molten pool M, i.e., the contacting part of the molten pool M and the filler wire 6b. As illustrated in FIG. 4, the conductive point P2 is the tip of the contacting part of the filler wire 6b and the feed block 17, i.e., the part closest to the molten pool M.

In this way, by setting the conductive heating distance Ex [m] larger than that in the related art, the filler current required for preheating the filler wire 6b can be significantly reduced compared with the related art. As a result, an increase in spatter due to magnetic interference of the leading electrode arc can be suppressed, and in this way, spatter can be reduced even more.

The conductive heating distance Ex [m] within the range mentioned above can be set by adjusting the physical distance by adjusting the size and length of the components during production process of the leading electrode torch 5a.

The insulated joints 18a and 18b insulate the feed block 17 such that the filler current supplied from the filler power supply 3b to the feed block 17 does not leak to other components and connects the feed block 17 and other components. The insulated joints 18a and 18b are insulating members and, as illustrated in FIG. 4, clamp the feed block 17 from both sides. The end of the insulated joint 18a closer to the torch tip is connected to the spring liner 14, the ceramic rings 15, and the insulating cover 16 via the connecting member 13b, and the other end closer to the torch rear is connected to the feed block 17. The end of the insulated joint 18b closer to the torch tip is connected to the feed block 17. The insulated joints 18a and 18b insulate the trailing electrode torch 5b.

In a filler wire feeding system including the feed block 17, the spring liner 14, and the wire guide 12, the filler wire 6b forward of the feed block 17 should be insulated. Thus, as described above, the ceramic rings 15 are aligned in the wire feeding direction such that the filler wire 6b can be send through the center of the ceramic rings 15. By covering the ceramic rings 15 with the spring liner 14 and/or the insulating cover 16 made of, for example, insulating resin, a desired curvature can be given to the filler wire feeding system, and thus, the positioning of the trailing electrode torch 5b becomes easy.

The holddown spring 19 is a forced feeding mechanism that reduces the diameter of the hole in the feed block 17 through which the filler wire 6b is fed in a direction toward the center. By reducing the diameter of the hole in the feed block 17 with the holddown spring 19, the feed block 17 and the filler wire 6b can easily contact each other. The holddown spring 19 can be made of a resilient member, such as a coil spring, and reduces the outer diameter of the feed block 17 toward the center within a range that does not interfere with the feeding of the filler wire 6b.

In the arc welding system 1, it is desirable that the electrode distance De [m], which is the distance between the tip of the consumable electrode wire 6a right above the molten pool M and the tip of the filler wire 6b, be within a range of $4 \times 10^{-3}$ to $15 \times 10^{-3}$ m. Since the wire tip wobbles because of bending of the wire when the electrode distance De [m] is smaller than $4 \times 10^{-3}$ m, the filler wire 6b inserted into the molten pool M while generating a leading electrode arc is excessively melted, and this causes an arc to be generated from the filler wire 6b. When the feeding rate Vw [m/s] of the filler wire 6b is increased to acquire a large welding capacity when the electrode distance De [m] is larger than or equal to $15 \times 10^{-3}$ m, the filler wire 6b remains in the molten pool M without completely melting even when the filler current is increased, and this causes a welding defect. Thus, with the arc welding system 1, stable welding can be performed by setting the electrode distance De [m] within the range mentioned above.

Figure 5:
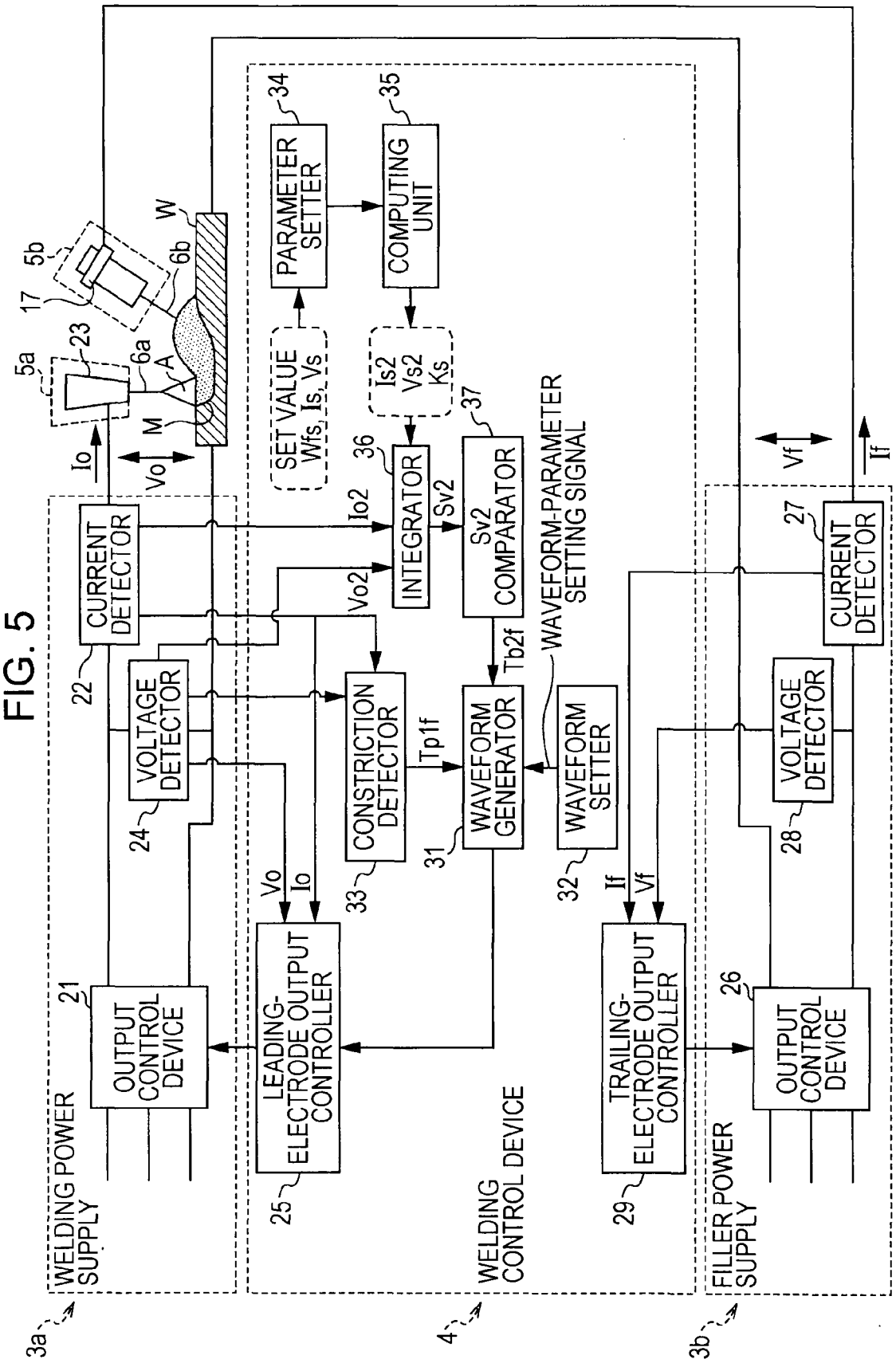
FIG. 5 is a block diagram illustrating the internal configuration of a welding power supply, a filler power supply, and the welding control device of the consumable-electrode gas-shield arc welding system according to an embodiment.

Detailed Configuration of Welding Power Supply, Filler Power Supply, and Welding Control Device The detailed configurations of the welding power supply 3a, the filler power supply 3b, and the welding control device 4 of the arc welding system 1 according to this embodiment will be described below in detail with reference to FIGS. 5 and 6. In FIG. 5, the leading electrode torch 5a and the trailing electrode torch 5b are illustrated in a simplified form.

As illustrated in FIG. 5, the welding power supply 3a includes an output control device 21, a current detector 22, and a voltage detector 24. The components included in the welding power supply 3a will be described in detail below.

The output control device 21 is connected to a commercial power supply, such as a three-phase, 200 V power supply. The current applied to the output control device 21 flows through a transformer (not shown), a rectifier, such as a diode, and a DC reactor to the feed chip 23 via the current detector 22, which detects the welding current. The feed chip 23 is accommodated in the leading electrode torch 5a, as represented by the dotted line.

As illustrated in FIG. 5, the welding member W to be welded is connected to the low power supply side of the output control device 21 via the transformer (not shown), and an arc is generated between the welding member W and the consumable electrode wire 6a passed through the feed chip 23 and receiving power.

The current detector 22 detects a welding current instantaneous value Io and outputs a current detection signal to a leading-electrode output controller 25. The current detector 22 detects a welding current instantaneous value Io2 in the second pulse period and outputs a detection signal to an integrator 36.

The voltage detector 24 detects a welding voltage instantaneous value Vo across the feed chip 23 and the welding member W and outputs a voltage detection signal to the leading-electrode output controller 25. The voltage detector 24 detects a welding voltage instantaneous value Vo2 in the second pulse period and outputs and detection signal to the integrator 36.

As illustrated in FIG. 5, the filler power supply 3b includes an output control device 26, a current detector 27, and a voltage detector 28. The components included in the filler power supply 3b will be described in detail below.

The output control device 26 is connected to a commercial power supply, such as a three-phase, 200 V power supply. The current applied to the output control device 26 flows through a transformer (not shown), a rectifier, such as a diode, and a DC reactor to the feed block 17 via the current detector 27, which detects the filler current. The feed block 17 is included in the trailing electrode torch 5b, as represented by the dotted line.

As illustrated in FIG. 5, the welding member W is connected to the low power supply side of the output control device 26 via the transformer (not shown). The filler wire 6b passed through the feed block 17 and receiving power is conductively heated and is inserted into the molten pool M formed in the welding member W.

The current detector 27 detects a filler current instantaneous value If and outputs a current detection signal to a trailing-electrode output controller 29.

The voltage detector 28 detects a filler voltage instantaneous value Vf across the feed block 17 and the welding member W and outputs a voltage detection signal to the trailing-electrode output controller 29.

As illustrated in FIG. 5, the welding control device 4 includes the leading-electrode output controller 25, the trailing-electrode output controller 29, a waveform generator 31, a waveform setter 32, a constriction detector 33, a parameter setter 34, a computing unit 35, the integrator 36, and a Sv2 comparator 37. The components included in the welding control device 4 will be described in detail below.

The leading-electrode output controller 25 determines command values of a welding current and a welding voltage supplied to the consumable electrode wire 6a on the basis of a welding current detection signal (Io) from the current detector 22, a welding voltage detection signal (Vo) from the voltage detector 24, and a signal representing a pulse waveform WP, which contains a first pulse 201 and a second pulse 202, from the waveform generator 31, and controls the welding output of the leading electrode torch 5a by outputting a welding command signal to control the output control device 21.

The trailing-electrode output controller 29 outputs a command signal to control the output control device 26 so as to control the filler output of the trailing electrode torch 5b. The trailing-electrode output controller 29 determines the command value of a filler current, which heats the filler wire 6b by Joule heat, and the command value of a filler voltage so that an arc is not generated between the filler wire 6b and the welding member W.

The trailing-electrode output controller 29 detects the voltage across the filler wire 6b and the welding member W and, when the voltage exceeds a predetermined value, i.e., when the generation of an arc is detected, immediately lowers the current value to 10 A or smaller, regardless of the set current value, to suppress the melting of the filler wire 6b and prevent the generation of an arc.

The waveform generator 31 alternately generates a first pulse 201 for detaching a droplet and a second pulse 202 for forming a droplet, which are two different types of pulsed signal having different pulsed waveforms WP, and outputs these pulses to the welding power supply 3a via the output control device 21. Thus, the waveform generator 31 receives various waveform parameters set at the waveform setter 32.

When a constriction 306 (see FIG. 2) is detected in a droplet, the waveform generator 31 immediately switches the current value of the first pulse 201 to a predetermined value lower than the current value at the time of detection. In this embodiment, the waveform generator 31 receives a first-pulse-period end signal (Tp1f) indicating the moment immediately before the detachment of a droplet from the constriction detector 33. Upon receiving a first-pulse-period end signal (Tp1f), the waveform generator 31 outputs an output correction signal for correcting the output of the leading-electrode output controller 25 to a first-pulse base current value Ib1 on the basis of the value set at the waveform setter 32 during the first-pulse base period Tb1. When a first-pulse-period end signal (Tp1f) is input to end the first-pulse base period Tb1, the waveform generator 31 outputs a waveform signal of the second pulse 202 having a pulse form set at the waveform setter 32 and then alternately outputs the first pulse 201 and the second pulse 202 again.

The waveform generator 31 receives from the Sv2 comparator 37 a second-pulse-base-period end signal (Tb2f) indicating that the calculation result of Expression 2 equals zero. Upon receiving a second-pulse-base-period end signal (Tb2f) in each pulse cycle, the waveform generator 31 ends the current pulse cycle and starts the next pulse cycle.

The waveform setter 32 sets in the waveform generator 31 waveform parameters of the first pulse 201 and the second pulse 202, such as peak currents, pulse peak periods, base currents, pulse base periods, rising slope periods, and falling slope periods. In this embodiment, the waveform setter 32 inputs to the waveform generator 31 waveform parameters stored in advance in a storage unit (not shown) as waveform-parameter setting signals.

The constriction detector 33 detects a constriction 306 in a droplet immediately before detachment, as described above, on the basis of the welding current detected at the current detector 22 and/or the welding voltage detected at the voltage detector 24. The constriction detector 33 is capable of detecting a constriction 306 in the droplet by using a first-order or second-order temporal differentiation signal for a welding voltage or arc impedance. In this embodiment, the constriction detector 33 detects a constriction 306 in a droplet on the basis of a second-order temporal differentiation value of a welding voltage instantaneous value Vo detected at the voltage detector 24.

Figure 6:
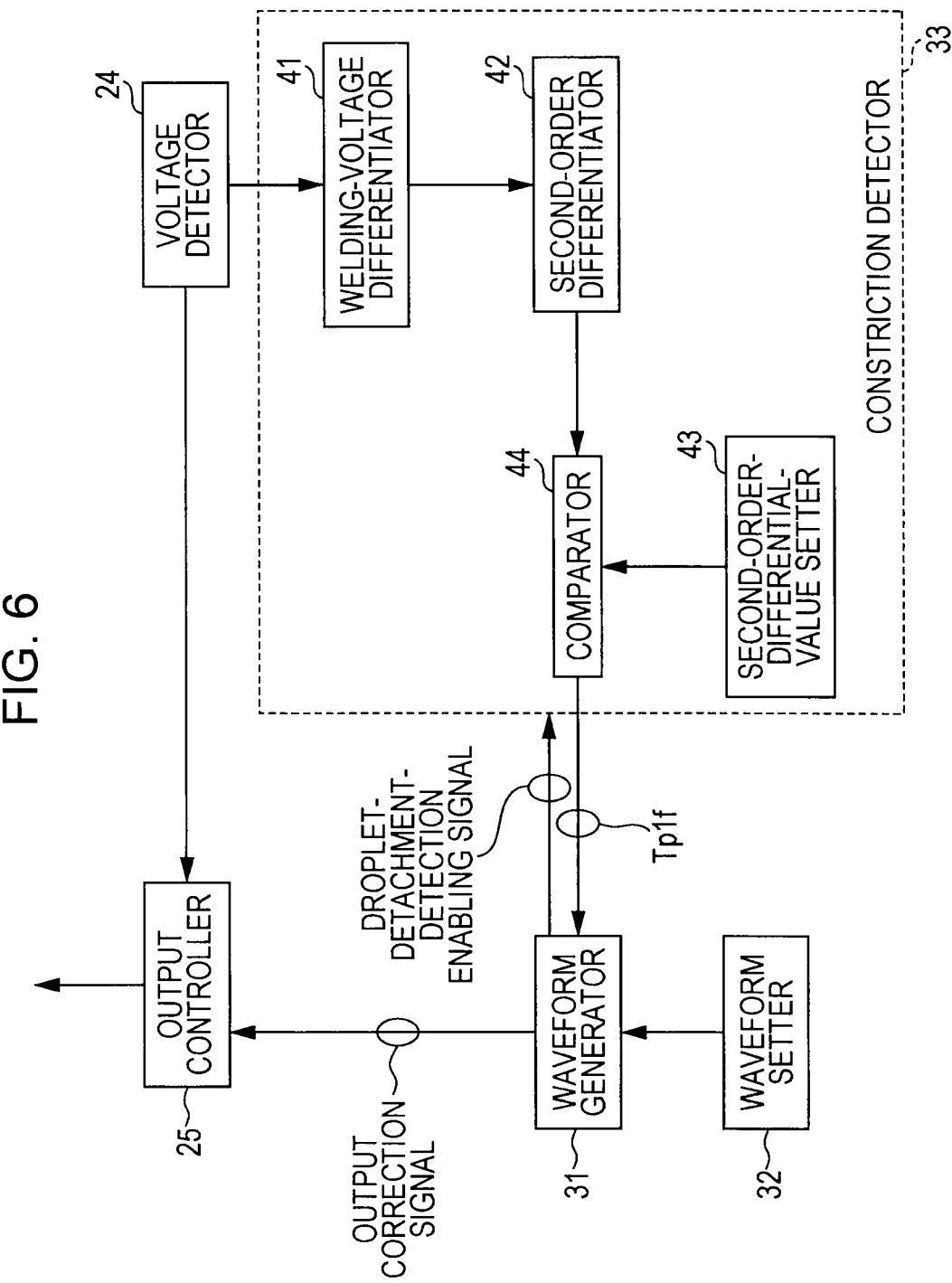
FIG. 6 is a block diagram illustrating a configuration of a constriction detector illustrated in FIG. 5.

In the arc welding system 1, as illustrated in FIG. 6, the constriction detector 33 includes a welding-voltage differentiator 41, a second-order differentiator 42, a second-order-differential-value setter 43, and a comparator 44 and, while receiving a droplet-detachment-detection enabling signal from the waveform generator 31, carries out processing at the components. The components included in the constriction detector 33 will be described in detail below.

The welding-voltage differentiator 41 temporally differentiates the welding-voltage instantaneous value Vo detected by the voltage detector 24. The temporal-differentiation voltage value dV/dt is temporally differentiated by the second-order differentiator 42, and the resulting second-order temporal-differential value $d^2V/dt^2$ is input to the comparator 44. The second-order-differential-value setter 43 sets, as a second-order temporal-differential value, a threshold that is equivalent to a welding-voltage second-order temporal-differential value, which is equivalent to the constriction formed immediately before a droplet is detached from the wire tip.

The comparator 44 compares a second-order differential detection value and a second-order differential set value; the second-order differential detection value is the second-order temporal-differential value of the welding-voltage instantaneous value Vo during welding input from the second-order differentiator 42, and the second-order differential set value is a second-order temporal-differential value set at the second-order-differential-value setter 43. The comparator 44 determines that a droplet is in a state immediately before detaching from the wire tip when the second-order differential detection value becomes larger than or equal to the second-order differential set value and outputs a first-pulse-period end signal (Tp1f) to the waveform generator 31. This is detecting the rising of welding voltage and resistance due to a progression in the constriction at the base of a droplet formed at the wire tip. When rising of the welding voltage and resistance is detected using a second-order temporal-differential value etc. in this way, the constriction 306 of a droplet can be detected precisely without being influenced by a change in the welding conditions during welding.

The welding control device 4 will be described further with reference to FIG. 5.

The parameter setter 34 sets the feeding rate of the consumable electrode wire 6a, the welding current set value Is, a welding voltage set value Vs, and so on in the computing unit 35. In this embodiment, the parameter setter 34 inputs welding parameters, which are stored in a storage unit (not shown) in advance, to the computing unit 35 as set parameter signals, such as a set-welding-current-value signal and a set-welding-voltage-value signal.

The computing unit 35 calculates various parameters on the basis of various predetermined values and inputs the calculated parameters to the integrator 36. Specifically, the computing unit 35 uniquely determines the external characteristic gradient Ks of the welding power supply 3a in accordance with the input values. The external characteristic gradient Ks is set appropriately in accordance with the welding current set value Is or the welding voltage set value Vs and in accordance with the feeding rate of the consumable electrode wire 6a and wire type. The computing unit 35 determines the external characteristic gradient Ks using, for example, a conversion table or a function.

The computing unit 35 uniquely determines a welding current set value Is2 in the second pulse period in accordance with the value Is of the input set-welding-current-value signal. The computing unit 35 determines the welding current set value Is2 in the second pulse period using, for example, a conversion table or a function.

Furthermore, the computing unit 35 uniquely determines a welding voltage set value Vs2 in the second pulse period in accordance with the value Vs of the input set-welding-voltage-value signal and the value Is of the input set-welding-current-value signal. In this embodiment, the computing unit 35 determines the welding voltage set value Vs2 in the second pulse period through calculations of Expression 3.

$$Vs2 = Vs2\_ini + Vs2\_chg(Vs - Vs\_ini) \quad (3)$$

In Expression 3, Vs_ini represents a unified central voltage that is determined in accordance with the welding current set value Is, Vs2_ini represents a unified central voltage in the second pulse period that is determined in accordance with the welding current set value Is2 in the second pulse direction, and Vs2_chg represents a change in the welding voltage set value Vs2 in the second pulse period when the value Vs of the set-welding-voltage-value signal is changed by 1V.

The integrator 36 uses the external characteristic gradients Ks input from the computing unit 35, the welding current set value Is2 and welding voltage set value Vs2 in the second pulse period, the welding current detection signal Io from the current detector 22, and the welding voltage detection signal Vo from the voltage detector 24 to calculate Expression 2 and outputs an integral value signal Sv2 representing the calculation result of a voltage-error integral value to the Sv2 comparator 37. The integrator 36 starts calculation of Expression 2 the moment the second pulse period of the pulse cycle starts. The integrator 36 ends the calculation when the calculation result of the voltage-error integral value Sv2 represented by Expression 2 equals zero.

The Sv2 comparator 37 determines whether the input voltage-error integral value Sv2 equals zero, and when Sv2=0, a second-pulse-base-period end signal Tb2f is output to the waveform generator 31. Upon receiving the second-pulse-base-period end signal Tb2f, the waveform generator 31 ends the current pulse cycle and starts the next pulse cycle. By repeating this in each pulse cycle, operating points can be formed on the external characteristic gradient Ks, and arc welding of one droplet per cycle can be achieved.

The arc welding system 1 having the above-described configuration lowers costs and improves efficiency of arc welding by using carbon oxide gas as shield gas G and using two electrode wires. By using a pulsed arc as the leading electrode arc, formation and detachment of droplets can be carried out regularly in synchronization with the pulse current waveform.

In an arc welding method using one electrode wire according to the related art, even when inexpensive carbon dioxide gas is used as shield gas G, by using a pulsed arc as the leading electrode arc, regular formation and detachment of droplet are possible, and low spatter welding become possible. However, with a hot-wire GMA welding method using two electrode wires according to the related art, since the conductive heating distance Ex [m] is merely approximately $25 \times 10^{-3}$ to $100 \times 10^{-3}$ m, it is necessary to apply a large current to the filler wire 6b, which is the trailing electrode. Thus, the leading electrode arc in the base periods Tb1 and Tb2 receives magnetic interference due to the large current, making regular formation and detachment of droplets impossible and causing arc interruption.

In contrast, in the arc welding system 1 according to this embodiment, by increasing the conductive heating distance of the filler wire 6b while the distance between the tip P1 of the filler wire 6b of the molten pool M and the conductive point P2 of the filler wire 6b is set within a predetermined range, the filler current required for preheating the filler wire 6b can be significantly reduced compared with that in the related art. Furthermore, by setting the trailing-electrode filler current value smaller than or equal to the leading-electrode base current value, magnetic interference to the leading electrode arc during the base periods Tb1 and Tb2 due to the filler current applied to the filler wire 6b, which is the trailing electrode, can be suppressed, and the rigidity of the leading electrode arc can be maintained.

Therefore, even when inexpensive carbon dioxide gas is used as the shield gas G, the formation and detachment of droplets are carried out in the same manner as when one electrode wire is used, and the amount of spatter generated can be significantly reduced compared with a hot-wire GMA welding method using a regular DC constant-voltage power supply for the leading electrode arc. Since arc welding using two electrode wires, i.e., the consumable electrode wire 6a and the conductively heated filler wire 6b, is performed, a large welding capacity can be achieved when performing multipass welding of moderately thick plates. Accordingly, a welding system of low costs, low spatter and high weldability can be provided.

With the arc welding system 1 according to this embodiment, it is desirable that the electrode distance De [m] be set in the range of $4 \times 10^{-3}$ to $15 \times 10^{-3}$ m, and the electrode distance De [m], the conductive heating distance Ex [m], the feeding rate Vw [m/s] of the filler wire 6b, and the current density J [A/m$^2$] of the filler wire 6b be set in advance to establish a relationship that satisfies Expression 1 presented below again.

$$4 \leq \left( \frac{Ex^2}{De \cdot Vw^2} j^2 \times 10^{-18} \right) \leq 10 \quad (1)$$

Expression 1 is a conditional expression representing the appropriate temperature distribution of the filler wire 6b.

When the electrode distance De [m], the conductive heating distance Ex [m], the feeding rate Vw [m/s] of the filler wire 6b, and the filler current value If [A] or the current density J [A/m$^2$] of the filler wire 6b are not appropriate values, underheating or overheating of the filler wire 6b may not be prevented.

A small electrode distance De [m] increases the temperature of the filler wire 6b as a result of the radiation heat from the leading electrode arc. A large conductive heating distance Ex [m] and a large filler current value If [A] increase the temperature of the filler wire 6b as a result of the effect of Joule heat. A large feeding rate Vw [m/s] of the filler wire 6b lowers the temperature of the filler wire 6b as a result of shorten heating time. The inventors have carried out extensive experiments by varying these parameters and have discovered that when the value of Expression 1 is within a range of 4 to 10, the temperature of the filler wire 6b disposed directly above the molten pool M becomes optimal.

In contrast, when the value of Expression 1 is below 4, the filler wire 6b is underheated, and the unmelted filler wire 6b may contact the welding member, causing spatter to be generated from the leading electrode arc by disturbing the molten pool M. When the value of Expression 1 exceeds 10, the filler wire 6b is overheated and softened, causing spatter to be generated as a result of an arc generated from the filler side due to a slight change in feeding. Thus, it is desirable that the value of Expression 1 be within the range of 4 to 10.

With the arc welding system 1 according to this embodiment, it is desirable that the filler current value If of the filler power supply 3b be set, in advance, to 150 A or smaller. In this way, by setting the filler current value If to a predetermined value or smaller, magnetic interference to the leading electrode arc during the base periods Tb1 and Tb2 due to a filler current applied to the filler wire 6b, which is the trailing electrode, can be suppressed.

The arc welding system 1 according to this embodiment may be configured as an arc welding system with three electrode wires by providing one more filler wire 6b behind the filler wire 6b, which is the trailing electrode. To provide such a three-electrode arc welding system, a wire feeding device 2b, a filler power supply 3b, a trailing electrode torch 5b, and a filler wire 6b may be added to correspond to the additional filler wire 6b, and a trailing-electrode output controller 29 may be added to the welding control device 4. By providing a three-electrode arc welding system in this way, efficiency can be further improved.

Consumable-Electrode Gas-Shield Arc Welding Method

An arc welding method according to this embodiment will be described in detail below. The arc welding method according to this embodiment is a method of performing welding by using carbon dioxide gas as shield gas G, forming a molten pool M by an arc generated at a consumable-electrode wire 6a, which is a leading electrode, and adding a filler wire 6b, which is a trailing electrode, to the molten pool M. The arc welding method according to this embodiment mainly includes two steps: a first step of forming the molten pool M by generating an arc between the consumable-electrode wire 6a and the welding member W and a second step of inserting the conductively-heated filler wire 6b into the molten pool M.

(1) First Step

In the first step, two different pulse waveforms having different pulse peak current levels and/or pulse widths in each cycle are alternately output; a pulsed arc that transfers one droplet per cycle is generated; and a molten pool M is formed.

The two different pulse waveforms, i.e., a first pulse 201 and a second pulse 202, are described above (see FIG. 1). The welding output of the consumable electrode wire 6a is controlled by the leading-electrode output controller 25 of the welding control device 4. That is, as illustrated in FIG. 5, the leading-electrode output controller 25 determines command values of a welding current and a welding voltage supplied to the consumable electrode wire 6a on the basis of a welding current detection signal (Io) from the current detector 22, a welding voltage detection signal (Vo) from the voltage detector 24, and a signal representing a pulse waveform WP, which contains a first pulse 201 and a second pulse 202, from the waveform generator 31, and controls the welding output of the leading electrode torch 5a by outputting a welding command signal to control the output control device 21.

Then, through such control by the leading-electrode output controller 25, a pulsed arc that transfers one droplet per cycle is generated between the consumable electrode wire 6a and the welding member W.

(2) Second Step

In the second step, the filler wire 6b conductively heated by a filler current is inserted into the molten pool M.

In the first and second steps described above, the feed block 17 and the feed chip 23 are insulated. As an insulating method, for example, the method of insulating the trailing electrode torch 5b, which is illustrated in FIG. 4, may be employed in which the trailing electrode torch 5b is insulated from the metal members except for the feed block 17 using insulating members, such as the ceramic rings 15, the insulating cover 16, and the insulated joints 18a and 18b. Instead, however, so long as the metal members except for the feed block 17 are insulated, any one or two of the ceramic rings 15, the insulating cover 16, and the insulated joints 18a and 18b may be used for insulation.

In the first and second steps described above, the conductive heating distance Ex [m] of the filler wire 6b is set within the range of $200 \times 10^{-3}$ to $500 \times 10^{-3}$ m. As described above, the conductive heating distance Ex [m] is the distance between the tip P1 of the filler wire 6b inserted into the molten pool M and the conductive point P2 of the filler wire 6b. As a method of setting the conductive heating distance Ex [m] within the range mentioned above, the physical distance may be adjusted by adjusting the size and distance of the components during the production process of the leading electrode torch 5a, as described above.

In the first and second steps described above, the pulse base current values Ib1 and Ib2, which are leading-electrode base current values, are set larger than the filler current value If, which is a trailing-electrode filler current value.

The arc welding method including the above-described steps lowers costs and improves efficiency of arc welding by using carbon dioxide gas as shield gas G and using two electrode wires. By using a pulsed arc as the leading electrode arc, the formation and detachment of droplets can be carried out regularly in synchronization with the pulse current waveforms.

By increasing the conductive heating distance Ex [m] of the filler wire 6b while the distance between the tip P1 of the filler wire 6b inserted into the molten pool M and the conductive point P2 of the filler wire 6b is set within a predetermined range, the filler current required for preheating the filler wire 6b can be significantly reduced compared with that in the related art. Furthermore, by setting the trailing-electrode filler current value smaller than or equal to the leading-electrode base current value, magnetic interference to the leading electrode arc during the base periods Tb1 and Tb2 due to the filler current applied to the filler wire 6b, which is the trailing electrode, can be suppressed, and the rigidity of the leading electrode arc can be maintained.

Therefore, even when inexpensive carbon dioxide gas is used as the shield gas G, the formation and detachment of droplets are carried out in the same manner as when one electrode wire is used, and the amount of spatter generated can be significantly reduced compared with a hot-wire GMA welding method using a regular DC constant-voltage power supply for the leading electrode arc. Since arc welding using two electrode wires, i.e., the consumable electrode wire 6a and the conductively heated filler wire 6b, is performed, a large welding capacity can be achieved when performing multipass welding of moderately thick plates. Accordingly, a welding method of low costs, low spatter, and high weldability can be carried out.

With the arc welding method according to this embodiment, it is desirable that the electrode distance De [m] be set in the range of $4 \times 10^{-3}$ to $15 \times 10^{-3}$ m, and the electrode distance De [m], the conductive heating distance Ex [m], the feeding rate Vw [m/s] of the filler wire 6b, and the current density J [A/m²] of the filler wire 6b be set in advance to establish a relationship that satisfies Expression 1 presented below again.

$$4 \leq \left( \frac{Ex^2}{De \cdot Vw^2} j^2 \times 10^{-18} \right) \leq 10 \quad (1)$$

By satisfying Expression 1, which is presented above again, the temperature distribution of the filler wire 6b directly above the molten pool M is optimized, and overheating and underheating of the filler wire 6b can be prevented. Therefore, the generation of spatter from the leading electrode arc due to, for example, unmelted filler wire 6b contacting the welding member and disturbing the molten pool M and the generation of spatter as a result of an arc generated from the filler side due to a slight change in feeding caused by overheating and softening of the filler wire 6b can be prevented.

In the arc welding method according to this embodiment, it is desirable that the filler current value If of the filler power supply 3b be set to 150 A or smaller in advance. In this way, by setting the filler current value If to a predetermined value or smaller, magnetic interference to the leading electrode arc during the base periods Tb1 and Tb2 due to a filler current applied to the filler wire 6b, which is the trailing electrode, can be suppressed.

FIRST EXAMPLE

Experimental examples confirming the advantages of the consumable-electrode gas-shield arc welding method according to the present invention will be described in detail below with reference to FIG. 7. In this example, the effect of performing pulsed arc welding, the effect of setting the conductive heating distance Ex [mm] within the range of 200 to 500 mm, and the effect of setting the pulse base current values Ib1 and Ib2 larger than the filler current value If when bead-on-plate welding by the consumable-electrode gas-shield arc welding method using two electrode wires was performed were verified. Table 1 lists the welding conditions of examples satisfying the requirements of the present invention and comparative examples not satisfying the requirements of the present invention. In this example, for the sake of description, the unit of the consumable electrode wire feeding rate is m/min, the unit of the filler wire feeding rate Vw is m/min, and the unit of the conductive heating distance Ex is mm.

TABLE 1

| | WELDING CONDITIONS | | | | |
|---|---|---|---|---|---|
| No. | PEAK CURRENT VALUE Ip1 [A] | PEAK CURRENT VALUE Ip2 [A] | PEAK CURRENT VALUE Ib1, Ib2 [A] | PEAK PERIOD Tp1 [ms] | PEAK PERIOD Tb1 [ms] |
| 1 | 500 | 420 | >FILLER CURRENT VALUE If | 1.8 | 2.5 |
| 2 | 500 | 420 | >FILLER CURRENT VALUE If | 1.8 | 2.5 |
| 3 | — | — | — | — | — |
| 4 | 500 | 420 | >FILLER CURRENT VALUE If | 1.8 | 2.5 |

| | WELDING CONDITIONS | | | | |
|---|---|---|---|---|---|
| No. | PEAK PERIOD Tp2 [ms] | PEAK PERIOD Tb2 [ms] | CONSUMABLE ELECTRODE WIRE FEEDING RATE [m/min] | CONDUCTIVE HEATING DISTANCE Ex [mm] | REMARKS |
| 1 | 3.5 | 3.5 | 15.0 | 200 | EXAMPLES |
| 2 | 3.5 | 3.5 | 15.0 | 500 | |
| 3 | — | — | 13.5 | 25 | COMPARATIVE |
| 4 | 3.5 | 3.5 | 15.0 | 200 | EXAMPLES |

The welding conditions other than those listed in Table 1 were the same for all examples, and are as listed below.
Other conditions
Shield gas: $CO_2$
Leading electrode: solid wire 1.2 mm$\phi$
Trailing electrode: flux-contained wire 1.2 mm$\phi$
Test plate: SM490A
Distance between Leading electrode chip and base metal: $25 \times 10^{-3}$ m
Average current value Ia of leading electrode: 300 A
Welding speed: 30 cm/min
Electrode distance De: $10 \times 10^{-3}$ m Nos. 1 and 2 in Table 1 are examples satisfying the requirements of the present invention in which pulsed arc welding was performed while the conductive heating distance Ex [mm] was set within the range of 200 to 500 mm and the pulse base current values Ib1 and Ib2 were set larger than the filler current value If.

No. 3 in Table 1 is a comparative example not satisfying the requirements of the present invention in which regular arc welding using a DC constant-voltage power supply was performed while the conductive heating distance Ex [mm] was set smaller than 200 mm. No. 4 is another comparative example not satisfying the requirements of the present invention in which pulsed arc welding was performed while the conductive heating distance Ex [mm] was set within the range of 200 to 500 mm and the pulse base current values Ib1 and Ib2 were set smaller than the filler current value If.

Figure 7A:
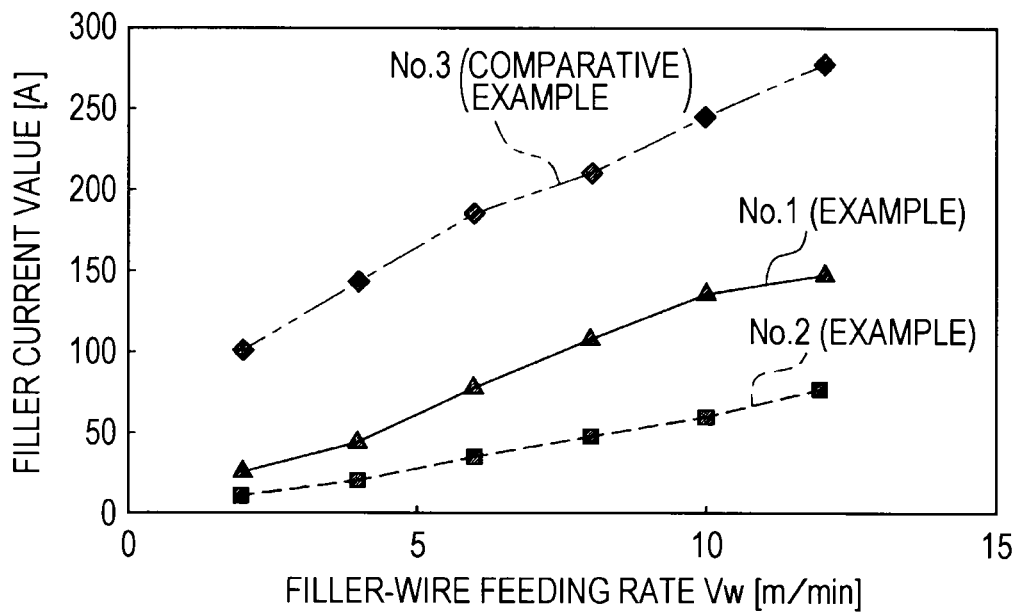
FIGS. 7A and 7B illustrate experimental examples verifying the advantages of the present invention, where

FIG. 7A is a graph of Nos. 1, 2, and 3 illustrating the relationship between the filler wire feeding rate Vw [m/min] and the filler current value If for different conductive heating distances Ex [mm]. As illustrated in FIG. 7A, the filler current value If required for arc welding was significantly reduced for Nos. 1 and 2 satisfying the requirements of the present invention compared with that for No. 3, which is a comparative example not satisfying the requirements of the present invention. In particular, the filler current value If was reduced significantly for No. 2 in which the conductive heating distance Ex [mm] was set to 500 mm.

Accordingly, the results in FIG. 7A show that the filler current value If supplied to the trailing electrode torch can be reduced significantly by establishing a correlation between the conductive heating distance Ex [mm] and the filler current value [A] and setting the conductive heating distance Ex [mm] within the range of 200 to 500 mm.

Figure 7B:
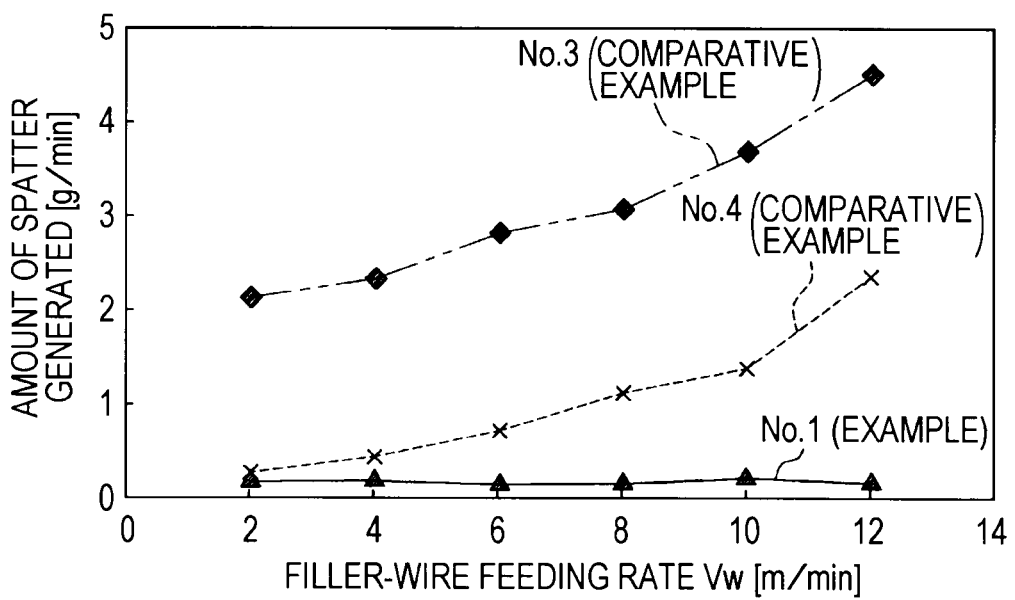

FIG. 7B illustrates the relationship between the filler wire feeding rate Vw [m/min] and the amount of spatter generated [g/min] for different conductive heating distances Ex [mm]. As illustrated in FIG. 7B, the amount of spatter generated [g/min] was significantly reduced for No. 1, which is an example satisfying the requirements of the present invention, compared with Nos. 3 and 4, which are comparative examples not satisfying the requirements of the present invention.

Accordingly, the results in FIG. 7B show that the amount of spatter generated can be significantly reduced by establishing a correlation between the amount of spatter generated [g/min] and a magnitude relationship of the conductive heating distance Ex [mm] with the pulse base current values Ib1 and Ib2 and the filler current value If, and by setting the conductive heating distance Ex [mm] within the range of 200 to 500 mm and setting the pulse base current values Ib1 and Ib2 larger than the filler current value If.

SECOND EXAMPLE

Another experimental example confirming the advantages of the consumable-electrode gas-shield arc welding method according to the present invention will be described in detail below with reference to FIG. 8. In this example, the effect of setting the pulse base current values Ib1 and Ib2 larger than the filler current value If when bead-on-plate welding is performed by a consumable-electrode gas-shield arc welding method using two electrode wires was verified. Since the welding conditions for this experimental examples were the same as those for No. 1 (example) in Table 1, and the welding conditions for the comparative example were the same as those for No. 4 (comparative example) in Table 1, detailed descriptions are not repeated.

FIG. 8A is a graph illustrating the temporal change of the welding current and welding voltage of the leading electrode and the filler current value If of the trailing electrode when pulsed arc welding was performed while the pulse base current values Ib1 and Ib2 were set smaller than the filler current value If. In FIG. 8A, the pulse waveform at the top represents the welding voltage of the leading electrode, the pulse waveform at the bottom represents the welding current of the leading electrode, and the linear waveform at the bottom represents the filler current of the trailing electrode.

As illustrated in FIG. 8A, the pulse waveforms of the welding current and the welding voltage were disturbed and interrupted in some areas. This indicates that the leading electrode arc in the base periods Tb1 and Tb2 received magnetic interference due to the filler current, and the arc was interrupted. Accordingly, the results in FIG. 8A show that, when the pulse base current values Ib1 and Ib2 are set smaller than the filler current value If, magnetic interference occurs at the leading electrode arc, causing an interruption in the arc.

FIG. 8B is a graph illustrating the temporal change of the welding current and welding voltage of the leading electrode and the filler current value If of the trailing electrode when pulsed arc welding was performed while the pulse base current values Ib1 and Ib2 were set larger than the filler current value If. In FIG. 8B, the pulse waveform at the top represents the welding voltage of the leading electrode, the pulse waveform at the bottom represents the welding current of the leading electrode, and the linear waveform at the bottom represents the filler current of the trailing electrode.

As illustrated in FIG. 8B, the pulse waveforms of the welding current and the welding voltage cycled without any disturbance. This indicates that the leading electrode arc in the base periods Tb1 and Tb2 did not receive magnetic interference due to the filler current and was not interrupted. Accordingly, the results in FIG. 8B show that, when the pulse base current values Ib1 and Ib2 were set larger than the filler current If, magnetic interference with the leading electrode arc can be prevented.

That is, the results in FIGS. 8A and 8B show that magnetic interference with the leading electrode arc due to the filler current during the base periods Tb1 and Tb2 can be suppressed, and the arc interruption can be prevented by establishing a correlation between the magnetic interference with the leading electrode arc in the base periods Tb1 and Tb2 and a magnitude relationship between the pulse base current values Ib1 and Ib2 and the filler current value If and by setting the pulse base current values Ib1 and Ib2 larger than the filler current value If.

THIRD EXAMPLE

Another experimental example confirming the advantages of the consumable-electrode gas-shield arc welding method according to the present invention will be described in detail below with reference to Table 2. In this experimental example, the above-described Expression 1, the magnitude relationship between the pulse base current values Ib1 and Ib2 and the filler current value If, and the relationship between pulsed arc welding and the amount of spatter generated were closely verified. Table 2 lists the welding conditions and welding results in this example. In this example, for the sake of description, the unit of the conductive heating distance Ex is mm, the unit of the electrode distance De is mm, and the unit of the filler wire feeding rate Vw is m/min. As listed in "Evaluation" in "Welding results" in Table 2, for the evaluation of the amount of spatter generated, a double circle (⊙) is provided in the Evaluation column when the value is less than 1.0 g/min; a single circle (○) is provided in the Evaluation column when the value is larger than or equal to 1.0 g/min and smaller than 2.0 g/min; and a cross (x) is provided in the Evaluation column when the value is greater than or equal to 2.0 g/min.

TABLE 2

| | | WELDING CONDITIONS | | | | |
|---|---|---|---|---|---|---|
| No | LEADING PULSE | CONDUCTIVE HEATING DISTANCE Ex [mm] | ELECTRODES DISTANCE De [mm] | FILLER WIRE FEEDING RATE Vw [m/min] | FILLER CURRENT VALUE If [A] | BASE CURRENT VALUE Ib1 [A] |
| 5 | PROVIDED | 200 | 4 | 2 | 25 | 80 |
| 6 | | 200 | 6 | 10 | 140 | 150 |
| 7 | | 200 | 9 | 6 | 90 | 120 |

TABLE 2-continued

| No | | | | | | |
|---|---|---|---|---|---|---|
| 8 | | 200 | 10 | 4 | 55 | 80 |
| 9 | | 200 | 8 | 8 | 130 | 150 |
| 10 | | 350 | 5 | 2 | 15 | 130 |
| 11 | | 350 | 7 | 6 | 55 | 80 |
| 12 | | 350 | 6 | 8 | 70 | 130 |
| 13 | | 350 | 8 | 11 | 110 | 120 |
| 14 | | 350 | 10 | 4 | 35 | 90 |
| 15 | | 350 | 12 | 10 | 100 | 150 |
| 16 | | 500 | 5 | 2 | 10 | 80 |
| 17 | | 500 | 6 | 10 | 60 | 100 |
| 18 | | 500 | 8 | 3 | 20 | 130 |
| 19 | | 500 | 9 | 9 | 55 | 140 |
| 20 | | 500 | 10 | 8 | 50 | 150 |
| 21 | | 500 | 12 | 4 | 30 | 130 |
| 22 | | 500 | 10 | 12 | 85 | 120 |
| 23 | | 200 | 3 | 4 | 20 | 100 |
| 24 | | 200 | 15 | 7 | 80 | 100 |
| 25 | | 350 | 4 | 4 | 30 | 120 |
| 26 | | 350 | 16 | 2 | 15 | 90 |
| 27 | | 500 | 5 | 7 | 45 | 100 |
| 28 | | 500 | 8 | 4 | 15 | 100 |
| 29 | | 500 | 7 | 8 | 60 | 120 |
| 30 | | 500 | 16 | 12 | 65 | 120 |
| 31 | | 500 | 3 | 6 | 30 | 120 |
| 32 | | 25 | 10 | 6 | 180 | 120 |
| 33 | | 25 | 10 | 10 | 240 | 150 |
| 34 | | 50 | 8 | 8 | 150 | 150 |
| 35 | | 50 | 8 | 10 | 180 | 130 |
| 36 | | 50 | 10 | 12 | 210 | 130 |
| 37 | | 200 | 6 | 7 | 120 | 100 |
| 38 | | 200 | 6 | 8 | 140 | 120 |
| 39 | | 200 | 4 | 10 | 170 | 130 |
| 40 | | 350 | 10 | 12 | 160 | 120 |
| 41 | | 350 | 6 | 12 | 150 | 120 |
| 42 | | 500 | 9 | 10 | 150 | 120 |
| 43 | | 500 | 8 | 6 | 80 | 70 |
| 44 | | 600 | 5 | 5 | 15 | 120 |
| 45 | | 600 | 7 | 10 | 40 | 100 |
| 46 | NOT | 500 | 4 | 6 | 30 | — |
| 47 | PROVIDED | 350 | 6 | 9 | 80 | — |
| 48 | | 200 | 6 | 8 | 120 | — |

| | WELDING CONDITIONS | | | WELDING RESULTS | | |
|---|---|---|---|---|---|---|
| No | BASE CURRENT VALUE $I_{b2}$ [A] | FILLER CURRENT DENSITY J [A/m$^2$] | PARAMETER | AMOUNT OF SPATTER [g/min] | EVALUATION | REMARKS |
| 5 | 90 | $2.6 \times 10^7$ | 6.1 | 0.3 | ⊙ | EXAMPLES |
| 6 | 150 | $1.7 \times 10^8$ | 6.5 | 0.7 | ⊙ | |
| 7 | 120 | $1.0 \times 10^8$ | 4.4 | 0.5 | ⊙ | |
| 8 | 100 | $7.5 \times 10^7$ | 5.0 | 0.6 | ⊙ | |
| 9 | 150 | $1.4 \times 10^8$ | 5.8 | 0.7 | ⊙ | |
| 10 | 150 | $1.6 \times 10^7$ | 5.4 | 0.2 | ⊙ | |
| 11 | 90 | $6.1 \times 10^7$ | 6.5 | 0.3 | ⊙ | |
| 12 | 130 | $8.8 \times 10^7$ | 9.0 | 0.4 | ⊙ | |
| 13 | 120 | $1.3 \times 10^8$ | 7.7 | 0.5 | ⊙ | |
| 14 | 100 | $4.4 \times 10^7$ | 5.4 | 0.3 | ⊙ | |
| 15 | 150 | $1.1 \times 10^8$ | 4.5 | 0.5 | ⊙ | |
| 16 | 100 | $1.0 \times 10^7$ | 4.9 | 0.2 | ⊙ | |
| 17 | 100 | $6.6 \times 10^7$ | 6.6 | 0.3 | ⊙ | |
| 18 | 130 | $2.4 \times 10^7$ | 7.0 | 0.3 | ⊙ | |
| 19 | 150 | $6.1 \times 10^7$ | 4.6 | 0.2 | ⊙ | |
| 20 | 150 | $6.3 \times 10^7$ | 5.6 | 0.3 | ⊙ | |
| 21 | 130 | $3.5 \times 10^7$ | 5.9 | 0.2 | ⊙ | |
| 22 | 150 | $1.0 \times 10^8$ | 6.3 | 0.4 | ⊙ | |
| 23 | 120 | $3.3 \times 10^7$ | 3.3 | 1.6 | ○ | |
| 24 | 120 | $8.8 \times 10^7$ | 1.5 | 1.8 | ○ | |
| 25 | 150 | $4.4 \times 10^7$ | 13.5 | 1.5 | ○ | |
| 26 | 100 | $1.8 \times 10^7$ | 2.2 | 1.7 | ○ | |
| 27 | 120 | $5.5 \times 10^7$ | 11.2 | 1.8 | ○ | |
| 28 | 130 | $2.2 \times 10^7$ | 3.9 | 1.6 | ○ | |
| 29 | 130 | $7.1 \times 10^7$ | 10.1 | 1.3 | ○ | |
| 30 | 130 | $7.7 \times 10^7$ | 2.3 | 1.3 | ○ | |
| 31 | 130 | $3.8 \times 10^7$ | 12.0 | 1.4 | ○ | |
| 32 | 120 | $2.3 \times 10^8$ | 0.3 | 2.1 | X | COMPARATIVE EXAMPLES |
| 33 | 150 | $2.7 \times 10^8$ | 0.2 | 2.4 | X | |
| 34 | 150 | $1.7 \times 10^8$ | 0.5 | 2.6 | X | |
| 35 | 160 | $1.9 \times 10^8$ | 0.4 | 2.6 | X | |

TABLE 2-continued

| | | | | | |
|---|---|---|---|---|---|
| 36 | 150 | $2.5 \times 10^8$ | 0.4 | 2.3 | X |
| 37 | 100 | $1.3 \times 10^8$ | 8.6 | 2.8 | X |
| 38 | 120 | $1.7 \times 10^8$ | 10.2 | 2.9 | X |
| 39 | 150 | $2.0 \times 10^8$ | 14.5 | 3.1 | X |
| 40 | 140 | $2.0 \times 10^8$ | 12.5 | 2.8 | X |
| 41 | 120 | $1.9 \times 10^8$ | 18.3 | 2.2 | X |
| 42 | 120 | $1.7 \times 10^8$ | 27.5 | 2.4 | X |
| 43 | 70 | $9.4 \times 10^7$ | 27.8 | 2.1 | X |
| 44 | 120 | $1.9 \times 10^7$ | 3.7 | — | X |
| 45 | 120 | $5.1 \times 10^7$ | 4.7 | — | X |
| 46 | — | $3.1 \times 10^7$ | 6.1 | 3.2 | X |
| 47 | — | $1.0 \times 10^8$ | 9.3 | 3.8 | X |
| 48 | — | $1.3 \times 10^8$ | 6.6 | 4.1 | X |

Nos. 5 to 31 in Table 2 are examples satisfying the requirements of the present invention. In particular, for Nos. 5 to 22, which are examples in which pulsed arc welding was performed, the conductive heating distances Ex [mm] were set within a range of 200 to 500 mm, the pulse base current values Ib1 and Ib2 were set larger than the filler current value If, and the parameters in Table 2, which are the values determined by Expression 1, were set within the range of 4 to 10. Accordingly, in comparison with the other examples, the amounts of spatter in Nos. 5 to 22 were reduced the most.

Nos. 23 to 31 are examples in which pulsed arc welding was performed, the conductive heating distance Ex [mm] was set within a range of 200 to 500 mm, the pulse base current values Ib1 and Ib2 were set larger than the filler current value If, and the parameters in Table 2, which are the value determined by Expression 1, were set within a range of 4 to 10. Accordingly, the amounts of spatter generated in Nos. 23 to 31 were reduced but not as much as in Nos. 5 to 22.

In Nos. 32 to 36, since the conductive heating distances Ex [mm] were set smaller than 200 mm, and the pulse base current values Ib1 and Ib2 were set smaller than the filler current value If, the amounts of spatter were not sufficiently reduced. Moreover, the parameters in Table 2, which are determined by Expression 1, were not set within a range of 5 to 15. In Nos. 37 to 43, since the pulse base current values Ib1 and Ib2 were set smaller than the filler current value If, the amounts of spatter were not sufficiently reduced. Moreover, the parameters in Table 2, which are determined by Expression 1, were not set within a range of 4 to 10, except for No. 37.

In Nos. 44 and 45, since the conductive heating distances Ex [mm] exceeded 500 mm, feeding failures occurred and the amounts of spatter were unmeasurable, and the parameters in Table 2, which are determined by Expression 1, were not set within a range of 4 to 10. In Nos. 46 to 48, since regular arc welding, not pulsed arc welding, was performed, the amounts of spatter were not sufficiently reduced.

The consumable-electrode gas-shield arc welding method and the consumable-electrode gas-shield arc welding system according to the present invention have been described above through embodiments and examples. However, the present invention is not limited thereto, and may be broadly interpreted through the claims. Furthermore, based on descriptions thereof, various changes and modifications may be included within the scope of the present invention.

What is claimed is:

1. A consumable-electrode gas-shield arc welding method comprising the steps of:
using carbon dioxide gas as shield gas;
forming the molten pool using a pulsed arc at the consumable electrode wire as a leading electrode arc transferring one droplet per cycle, by alternately outputting pulses, one at a time in each cycle, of two different pulse waveforms having a base current value, of which at least one of a pulse peak current level and a pulse width per period differ for the two different pulse waveforms;
inserting a filler wire as a trailing electrode into a molten pool formed by an arc generated at a consumable electrode wire, wherein the filler wire has been conductively heated by a filler current starting at a conductive point separate from the molten pool;
setting the conductive distance Ex between a tip of the filler wire inserted into the molten pool and the conductive point of the filler current to the filler wire within a range of $200 \times 10^{-3}$ to $500 \times 10^{-3}$ m; and
setting the trailing-electrode filler current value to a low value lower than the leading-electrode base current value, whereby spatter is reduced.

2. The consumable-electrode gas-shield arc welding method according to claim 1,
wherein an electrode distance De between a tip of the consumable electrode wire and the tip of the filler wire is set within a range of $4 \times 10^{-3}$ to $15 \times 10^{-3}$ m, and
wherein the relationship among the electrode distance De, and conductive heating distance Ex between the tip of the filler wire inserted into the molten pool and the conductive point of the filler wire, the feeding rate Vw of the filler wire, and the current density J of the filler wire satisfies the following expression:

$$4 \leq \left( \frac{Ex^2}{De \cdot Vw^2} j^2 \times 10^{-18} \right) \leq 10. \quad (1)$$

3. The consumable-electrode gas-shield arc welding method according to claim 1, wherein the trailing-electrode filler current value is set to 150A or smaller.

4. The consumable-electrode gas-shield arc welding method according to claim 1, wherein the shield gas is exclusively carbon dioxide.

5. A consumable-electrode gas-shield arc welding system using carbon dioxide gas as shield gas comprising:
a leading electrode torch supplying a consumable electrode wire comprising a leading electrode to a member to be welded, the leading electrode torch forming a molten pool using a pulsed arc as a leading electrode arc transferring one droplet per cycle by alternately outputting pulses, one at a time, of two different pulse waveforms having a base current value, of which at least one of the pulse peak current level and the pulse width per period differ pulse by pulse for the two different pulse waveforms; and a trailing electrode torch supplying a filler wire as a trailing electrode to the molten pool, the trailing electrode torch including a feeding member arranged such that the conductive distance between a tip of the filler wire inserted into the molten pool and a conductive point of a filler current the filler wire is separate from the molten pool and is within a range of $200 \times 10^{-3}$ to $500 \times 10^{-3}$ m, the feeding member conductively heating the filler wire with the filler current, wherein the leading-electrode base current value is set larger than a trailing-electrode filler current value.

\* \* \* \* \*